United States Patent Office 3,309,373
Patented Mar. 14, 1967

3,309,373
N - NITROSO DERIVATIVES OF AROMATIC AMINES AND A METHOD FOR THEIR PREPARATION
Morris J. Danzig, Springfield, Pa., assignor to Lord Corporation, a corporation of Pennsylvania
No Drawing. Filed May 31, 1961, Ser. No. 113,635
20 Claims. (Cl. 260—296)

This invention relates to a new reaction, and more particularly, provides a novel reaction of nitric oxide and a base with oxime compounds, and novel nitroso-substituted salt products of such reaction. This application is a continuation-in-part of my copending application Serial No. 859,095, now abandoned.

A principal object of this invention is to provide a novel reaction of certain oxime compounds with nitric oxide and a base, and novel products thereof.

Another object is to provide novel compounds comprising salts of nitrogen-containing compounds which are produced by the reaction of a quinone oxime or an aldoxime with nitric oxide and a base.

A further object of this invention is to provide novel compounds having utility as vulcanizing agents for curing polychloroprene and like rubbers.

An additional object of this invention is to provide novel compounds which are effective metal precipitating agents.

Another object is to provide a method of making the stated novel compounds.

Another object is to provide a novel method for converting tautomers of quinone oximes to useful novel products.

These and other objects will become evident from a consideration of the following specification and claims.

It has now been found that nitric oxide and a base give a novel reaction of general applicability with oxime compounds, producing novel useful products which are nitroso-substituted salts.

The general characteristic of this reaction is the conversion of a carbonyl derivative group

to a nitroso-substituted salt group

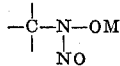

M is the action of the base employed in the reaction. It has been shown that the carbonyl carbon atom may be either aliphatic, as in an aldoxime, or aromatic, as in a quinone oxime.

The novel products provided by this invention are valuable materials which are of utility for a variety of industrial and agricultural purposes. A particularly outstanding characteristic of the presently provided compounds is their ability to act as curing agents in the vulcanization of elastomers. The products of reaction of compounds as provided herein also include nitrogen compounds, especially oxime imine derivatives, which are converted by acids to accelerators for the cure of butyl rubber. Certain of the presently provided compounds especially aldoxime derivatives, also act as foaming agents in the production of foamed elastomeric products.

Moreover, compounds of the present invention are chelating agents and effective metal-precipitating agents, and as such, can be utilized in both qualitative and quantitative analysis. The present products may also be used by the chemical industry as rubber cure accelerators, particularly for butyl and natural systems, antiknocks and octane number increasing fuel additives, indicator dyes, explosives, corrosion inhibitors and the like. For agricultural purposes, certain of the presently provided compounds may be utilized as fungicides or for the control of other undesirable organisms.

Thus, it will be apparent that the novel products made available by this invention have many important and diverse uses.

SCOPE OF INVENTION

As noted above, the novel reaction provided hereby has been shown to be of very broad applicability, as evidenced in examples hereafter. For the sake of brevity herein, there are set forth here and subsequently discussions illustrating variations in the scope of the invention, to which reference may be made subsequently in considering details of the invention to avoid repetition.

As stated above, present novel reaction is characterized by the treatment of an oxime compound:

with nitric oxide and a base to produce a nitroso-substituted salt containing the group

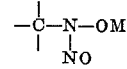

where M is the cation of the base employed.

Referring to the cation of said salts, preferably a base in which sodium is the cation is employed. The product is then a sodium salt. Other salts of water-solubilizing metal cations may be prepared by using a base containing the corresponding cation: illustrative of such products are salts of the other alkali metals such as potassium and lithium. Salts with the cations of nitrogenous bases, such as the piperazine, piperidine, ethylamine, diethylamine and ammonium salts, are also provided by this invention. As will be discussed more in detail hereinafter, salts with other metals can conveniently be prepared from the foregoing salts by metathesis.

In the discussion of these reaction products hereinafter, it is to be understood that while illustrative salts mentioned are limited to the sodium salts, for the sake of simplicity in discussion of this invention, the additional salts provided hereby including cations such as the illustrative cations mentioned above, are intended to be included.

A further general characteristic of this invention is that the starting materials may contain either one or more than one

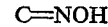

group. Thus, where an aldoxime is represented by a formula R'CH=NOH, this is intended to include dialdoximes, the formula of which may be written as

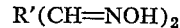

and similar poly-oximes. Compounds containing from 1 to 2 such groups are especially preferred, but compounds containing a higher number of such groups are contemplated and intended to be included.

According to the invention, the carbon atom of the group C=NOH may be aliphatic or aromatic.

When it is aliphatic, the compounds susceptible to the invention are of the formula R'CH=NOH where R' is an organic radical. These are aldoximes, which are converted by the method of the invention to hydroxylamine salts as follows:

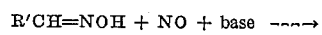

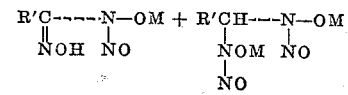

Where the stated carbon atom is aromatic, the compounds susceptible to the invention are of the formula $$A_x\text{—}Y\text{=Aryl=}N\text{—OH}$$

Y is an element capable of being doubly bonded to a C atom. A is a substituent, and $x$ is the valence of Y minus 2. Aryl is an aromatic radical.

According to the invention, such compounds are reacted with NO and a base, whereby hydroxylamine salts are formed as shown in the following equation $$A_x\text{—}Y\text{=Aryl=}NOH + NO + \text{base} \longrightarrow A_x\text{—}Y\text{—Aryl—}N\text{—OM}$$
$$\hspace{6em} | \hspace{3em} |$$
$$\hspace{6em} Z \hspace{3em} NO$$

In accordance with a first embodiment of this aspect of the invention, Y is N. In this case, Z is NO, and the reaction occurring may be represented as follows $$A\text{—}N\text{=Aryl=}NOH + NO + \text{base} \longrightarrow A\text{—}N\text{—Aryl—}N\text{—OM}$$
$$\hspace{10em} | \hspace{3em} |$$
$$\hspace{10em} NO \hspace{2em} NO$$

In accordance with a second embodiment of the invention, Y is C. In this case, it has been determined that the reaction proceeds as represented generally by the above equation, that is:

$$\begin{array}{c}A' \\ \diagdown \\ \hspace{1em}C\text{=Aryl=}N\text{—OH} + NO + \text{base} \longrightarrow \\ \diagup \\ A''\end{array} \quad \begin{array}{c}A' \\ \diagdown \\ \hspace{1em}C\text{—Aryl—}N\text{—OM} \\ \diagup \hspace{1em} | \hspace{2em} | \\ A'' \hspace{0.5em} Z \hspace{2em} NO\end{array}$$

A' and A" represent the two substituents A required to satisfy the valance of carbon. In this embodiment also, a substituent Z is introduced, but this is not NO. The product of the reaction has not been definitely identified as yet, as further discussed hereinafter.

Since more specific understanding of the invention will be facilitated by discussion of the stated various embodiments thereof individually, subsequent discussion is now presented in such manner.

THE QUINONES

Quinones are the starting materials for practice of the novel method of this invention wherein the carbon atom of the group $>C$=NOH is aromatic. These quinones will have the general formula $$(A)_x\text{—}Y\text{=Aryl=}NOH$$

where Y is selected from the class consisting of nitrogen and carbon. These quinones preferably will be selected from quinone oximes of the formula $$A\text{—}N\text{=Aryl=}NOH$$

and $$\begin{array}{c}A' \\ \diagdown \\ \hspace{1em}C\text{=Aryl=}NOH \\ \diagup \\ A''\end{array}$$

The substituents A (or A' and A"), it has now been established may vary very widely. As noted above, this invention is applicable to polyoximes, and thus the group A—N= may represent a second oxime group, in which A is the inorganic group HO—. Other inorganic substituents which A may represent include, for example, H$_2$NCONH— and H$_2$NCSNH—, —SH and —CN. Organic substituents A may represent also include radicals terminating in O, such as ether and acyl radicals; radicals terminating in N, such as substituted amino radicals; radicals terminating in S, such as organomercapto and organosulfonyl radicals; and radicals terminating in C.

Referring to the organic substituents which may be A, where A is a radical terminating in C, or which A may comprise, such as the organic portion of an ether group, these are C-terminated radicals which are hydrocarbon, hydrocarbon interrupted by one of the elements O, N and S, or such a hydrocarbon or interrupted hydrocarbon chain carrying one or more functional groups. They may be aliphatic (saturated or unsaturated, straight chain, branched, or cyclic) or aromatic (including aralkyl and alkaryl), including heterocyclic (O, N or S). They will generally contain 1 to 18 carbon atoms. The functional groups on the stated organic radical may be inert or reactive. Reactive functions will be —N=C groups such as additional imine and oxime groups; where A is polyvalent, it may, for example, provide a bridge between two —N=Aryl=NOH groups, as illustrated by the compound (—CH$_2$—N=Aryl=NOH)$_2$. Functional groups which may be present in the radical as inert substituents include halogen such as chlorine, carboxyl (including carboxy salts and esters), nitro, amido, keto, cyano, and the like. As will appear hereinafter, the group of novel compounds provided by this invention include products wherein said organic radical comprise from 0 to 2 radicals selected from the group consisting of chloro, nitro and carboxy.

The aryl in the above-stated formula of presently useful aromatic carbonyl compounds is an aromatic nucleus. It may contain from 1 to 3 fused benzene rings. Thus the quinone oximes used to produce the novel compounds provided hereby may be o- or p-benzophenanthraquinone oximes. Where reference is made hereinafter to quinone oxime compounds in the specification and claims, it is intended to be understood as referring to the stated quinones. Preferably they will be 1,4-benzoquinone oximes, such as $$A\text{—}N\text{=}\underset{=}{\bigcirc}\text{=NOH} \quad \text{and} \quad \begin{array}{c}A' \\ \diagdown \\ \hspace{1em}C\text{=}\underset{=}{\bigcirc}\text{=NOH} \\ \diagup \\ A''\end{array}$$

Referring to substituents on the aryl nucleus of the starting materials, the novel reaction of this invention is applicable to quinone oximes substituted by any inert substituents such as ar- substituted chlorine, nitro, alkyl and so forth. Specifically contemplated as starting materials for production of the novel arylene nitrosohydroxylamines provided by this invention are quinone oximes substituted by from 0 to 2 chlorine atoms or lower alkyl radicals, where lower alkyl is saturated hydrocarbon of from 1 to 5 carbon atoms, such as 2-chloro-1,4-benzoquinone oximes, 2,5-dichloro-1,4-benzoquinone oximes, 2,3-dichloro-1,4-benzoquinone oximes, and thymol quinone oximes. References hereinafter to quinone oximes and benzoquinone oximes in the specification and claims are intended to include such substituted quinone oximes.

THE QUINONE OXIME IMINES

Of the presently useful class of quinone oximes, the first embodiment of the invention relates to quinone diimines (quinone oxime imines) as starting materials for the practice of this invention. The reaction occurring in this case may be illustrated generally as follows $$A\text{—}N\text{=Aryl=}NOH + NO + \text{base} \longrightarrow A\text{—}N\text{—Aryl—}N\text{—OM}$$
$$\hspace{10em} | \hspace{3em} |$$
$$\hspace{10em} NO \hspace{2em} NO$$

where A and aryl are as defined above, and M is the cation of the stated base. The products are the novel nitrosohydroxylamine salts provided by this invention. As will appear hereinafter, the stated reaction also includes starting from corresponding tautomeric monomers, as illustrated by the equation $$\hspace{4em}\text{base}$$
$$A\text{—NH-Aryl-}NO \rightleftarrows [A\text{—}N\text{=Aryl=}NOH] + \text{base} + NO \longrightarrow$$
$$\hspace{14em} A\text{—}N\text{-Aryl-}N\text{—OM}$$
$$\hspace{14em} | \hspace{3em} |$$
$$\hspace{14em} NO \hspace{2em} NO$$

Since the substituent A may represent a wide variety of different groups, as has now been established, the invention as applied to said quinone oxime imines is hereinafter discussed as applied to these several classes, where A is a substituent terminating in O, in N, in C and in S.

QUINONE OXIMES IN WHICH A IS A GROUP TERMINATED BY OXYGEN

One type of substituent which A may represent is an OH group, in which case the foregoing formula represents the first class of quinone diimines to which the present invention is applicable, which are the quinone dioximes, that is the benzoquinone dioximes, the naphthoquinone dioximes, the anthraquinone dioximes and the phenanthraquinone dioximes. The most preferred member of this class is the compound which is designated as benzoquinone dioxime, of the formula:

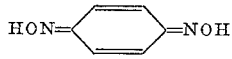

A further group of quinone dioximes to which the method of the invention can be applied comprises polycyclic quinone dioximes, like the naphthoquinone dioximes, such as 1,4-napththoquinone dioxime, the anthraquinone dioximes, such as 9,10-anthraquinone dioxime, and the phenanthraquinone dioximes, such as 9,10-phenanthraquinone dioxime. Also susceptible to the method of the invention are quinone dioximes substituted by from 1 to 2 atoms of radicals which are inert to nitric oxide, such as chlorine atoms, alkyl groups and the like. Referring to the statement made above, herein and in the claims where reference is made to a quinone dioxime, a benzoquinone dioxime, a naphthoquinone dioxime, an anthraquinone dioxime or a phenanthraquinone dioxime without further qualifications, it will be understood to include such substituted derivatives as well as the unsubstituted compounds.

Illustrative of halogenated quinone dioximes are:

2-chloro 1,4-benzoquinone dioxime
2,3-dichloro-1,4-benzoquinone dioxime
2,5-dichloro-1,4-benzoquinone dioxime Thymolquinone dioxime is an example of a quinone dioxime containing alkyl substituents.

When the starting material for the method of the invention is a quinone dioxime, the reaction which occurs is illustrated by the following equation:

$$HON=Aryl=NOH + 2\,base + 2\,NO \longrightarrow \underset{\underset{NO}{|}}{MON}-Aryl-\underset{\underset{NO}{|}}{NOM}$$

where M is the cation of the base employed and aryl is a phenylene, naphthylene, anthracene or phenanthracene nucleus. As has been mentioned above, in the basic solutions employed to conduct the present reaction, the anion OH is equivalent to the anion OM, and thus the reaction in effect preserves the radical A unchanged in the ultimate product.

The products of the reaction of quinone dioximes with nitric oxide and a base in accordance with the present invention are arylene - N,N' - dinitrosodihydroxylamine salts. Thus, for example, where 1,4-benzoquinone dioxime itself is reacted in accordance with the invention with NO and a base, the product is the disodium or other salt of p-phenylene-N,N'-dinitrosodihydroxylamine. Similarly, where a chlorinated 1,4-benzoquinone dioxime is reacted with NO and a base in accordance with the invention, the product is the corresponding salt of a p-phenylene-N,N'-dinitrosohydroxylamine in which the phenylene radical is chlorinated.

Illustrative of such products are the disodium or other salts of 2-chloro-1,4-phenylene-N,N'-dinitrosodihydroxylamine, 2,5-dichloro-1,4 - phenylene - N,N' - dinitrosodihydroxylamine, 3,5-dichloro-1,4-phenylene-N,N'-dinitrosodihydroxylamine, and so forth.

Products provided by this invention from a reaction of a polycyclic quinone dioxime include, for example, the disodium or other salts of 1,4-naphthylene-N,N'-dinitrosodihydroxylamine, 9,10-anthracene - N,N'-dinitrosodihydroxylamine, 9,10-phenanthracene - N,N'-dinitrosodihydroxylamine, and so forth.

As will appear hereinafter, these quinone dioxime reaction products can be converted to the corresponding diethers, which are also provided by this invention.

A may also represent an organic O-terminated group, in which case the quinone diimines which are susceptible to the method of this invention are quinone dioxime mono ethers and mono esters.

Referring to such monoethers, these will be represented by the general formula $$RO-N=Aryl=NOH$$

where aryl is as defined above, and R is an organic radical as defined in connection with the organic substituents which A may comprise.

Illustrative of such ethers to which the novel reaction of this invention may be applied are the methyl ether of 1,4-benzoquinone dioxime:

the corresponding ethers such as the butyl and isohexyl, cyclohexyl, phenyl, benzyl, tolyl and furfuryl, chloroethyl, 2-carboxyphenyl, 3-cyanophenyl, 4-benzamidonaphthyl, and 2-ethoxyethyl ether, glycol bis(monoether) and so forth; and the same and similar ethers of substituted and polycyclic quinone dioximes as indicated above, such as the methyl ether of 2-chloro-1,4-benzoquinone dioxime, and so forth.

A third type of o-terminated group which A may represent is an ester radical, that is, an O-acyl radical wherein the terminal acid ester functional group, OCO or OSO$_2$, is linked to a radical R, where R is as defined above. Thus, for example, the oxime employed may be the acetic monoester of benzoquinone dioxime:

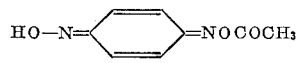

The acetyl radical, —COCH$_3$, may be replaced by other acyl radicals of formula

where R is as defined above, so that illustrative materials employable herein include, for example, the benzoic monoester, the cyclohexylcarboxylic monoester, the chlorobutanoic monoester, the nitrobenzoic monoester, the succinic bis(monoester) and so forth, of quinone dioximes as set forth hereinabove.

Additionally, A may be an ester radical in which O is linked to the acyl radical of a sulfonic acid. Thus compounds included here comprise, for example, the tosyl monoester of benzoquinone dioxime

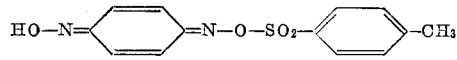

the benzenesulfonic acid monoester, the methanesulfonic acid monoester, the taurine monoester, the isethionic acid monoester, the ethionic acid bis(monoester) and so forth of quinone dioximes as set forth hereinabove, having one N bonded to a radical of formula —O—SO$_2$—R where R is as defined above.

When the starting material is a monoether or monoester of a quinone dioxime, the reaction which occurs is illustrated by the equation

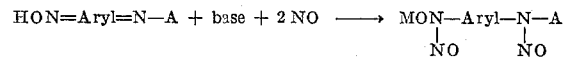

where A is —OR, or —O-acyl where acyl is —COR or —SO$_2$R, and M, acyl and R are as defined above. Thus the products of reaction of a monoether are arylene —N,N'-dinitrosodihydroxylamine monoether mono-salts such as 1,4 - phenylene - N,N'-dinitrosodihydroxylamine monether mono-salts such as 1,4-phenylene-N,N'-dinitrosodihydroxylamine monomethyl ether monosodium salt, the glycerol tris (monoether) of 2-chloro-1,4-phenylene - N,N'-dinitrosodihydroxylamine monosodium salt, 1,4 - naphthylene - N,N'-dinitrosodihydroxylamine monophenyl ether monosodium salt, and so forth. Thus products of reaction of a monoester are arylene-N,N'-dinitrosodihydroxylamine monoester mono-salts, such as 1,4-phenylene - N,N' - dinitrosodihydroxylamine monoacetate ester monosodium salt; the corresponding benzoate, chloroacetate, cyanobutyrate, and carbethoxybenzoate esters; the corresponding tosylate, sulfonamidobenezene-sulfonate, and methane sulfonate esters; the succinate, maleate and oxalate bis(monoesters) of 1,4-phenylene-N,N'-dinitrosodihydroxylamine monosodium salt; the same and similar esters of substituted and polycycle arylene diamines such as 2,5-dichloro-1,4-phenylene - N,N' - dinitrosodihydroxylamine, 1-4,naphthylene - N,N' - dinitrosodihydroxylamine, 9,10-anthracene-N,N' - dinitrosodihydroxylamine, 9,10 - phenanthracene-N,N'-dinitrosodihydroxylamine, and so forth.

QUINONE OXIMES IN WHICH A IS A GROUP TERMINATED BY NITROGEN

Another group of p-(substituted-imino) quinone oximes which have been demonstrated to be susceptible to the reaction with nitric oxide provided by this invention are the quinone oxime imines wherein the imino nitrogen atom is substituted by a radical terminating in a nitrogen atom. This type of compound includes quinone oxime hydrazones, semicarbazones, thiosemicarbazones, carbohydrazones, and the like. These quinone oximes are referred to herein as a class, as quinone oxime azones.

As in the case of the quinone oximes discussed hereinabove, the useful quinones includes the benzoquinone, the naphthoquinone, the anthraquinone, and the phenanthraquinone derivatives of the stated type, of which the p-benzoquinone oxime azones are preferred. Also, as in the case of the quinone oximes discussed hereinabove, for the preparation of novel compounds as specifically provided hereby any of these may contain, on the aromatic ring, from 1 to 2 atoms or radicals which are inert to nitric oxide such as chlorine atoms and alkyl radicals, and herein and in the claims where reference is made to a quinone oxime azone or to a benzoquinone oxime azone, a naphthoquinone oxime azone, an anthraquinone oxime azone, or a phenanthraquinone oxime azone, it is to be understood to include such substituted derivatives as well as the unsubstituted compounds.

A in the general formula for these quinone diimine derivatives represents one of the N-terminated groups $NH_2$, NHR, $NHCONH_2$, or the corresponding difunctional group NHCONH linked to two quinone oxime imine radicals, $NHCSNH_2$ and NHCSNH. R is as defined above, generally. More specifically, R here will preferably be aryl hydrocarbon, containing up to 3 benzene rings, substituted by from 0 to 2 inert substituents, particularly chloro, nitro or lower alkyl substituents.

Presently useful benzoquinone oxime azones include unsubstituted hydrazones such as p-benzoquinone oxime hydrazone, and 3-chloro-1,4-benzoquinone oxime hydrazone; and also substituted hydrazones such as a p-benzoquinone oxime phenylhydrazone, p-benzoquinone oxime 2,4-dinitrophenylhydrazone, and p-benzoquinone oxime chlorophenylhydrazone. They also include p-benzoquinone oxime semicarbazone and p-benzoquinone oxime thiosemicarbazone, as well as the bis azone derivative, p-benzoquinone oxime carbohydrazone, which has the formula

The corresponding hydrazones, phenylhydrazones, dinitrophenylhydrazones and the like, semicarbazones, thiosemicarbazones and carbohydrazones of the polycyclic quinone oximes including 1,4-naphthoquinone oxime, 9,10-anthraquinone oxime and 9,10-phenanthraquinone oxime may alternatively be employed.

When the starting material for the method of the invention is a quinone oxime azone, the reaction which occurs is illustrated by the following equation:

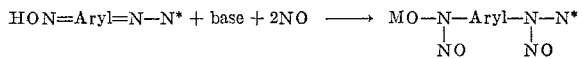

where M is the cation of the base employed, aryl is a phenyl, naphthyl, anthracyl or phenanthracyl nucleus, and N* is an amidogen group, that is, one of the N-terminated. radicals A may represent as stated above. For example, where the starting material is an unsubstituted hydrazone, N* is $NH_2$. The products of the reaction of quinone oxime azones with nitric oxide and a base in accordance with the present invention are N-nitroso-N-hydroxyl N'-nitroso-N'-amino p-arylenediamine salts; the particular nomenclature for the products varies, depending on their structure.

Thus for example, where benzoquinone oxime hydrazone is reacted in accordance with the invention with nitric oxide and a base, the product is the sodium or other salt of p-(1-nitrosohydrazino)phenyl-N-nitrosohydroxyl-amine. Where a benzoquinone oxime substituted hydrazone is employed as a starting material, the product similarly will comprise the sodium or other salts of nitrosohydrazino phenyl nitrosohydroxylamines such as p - (1 - nitroso - 2-phenylhydrazino(phenyl-N-nitrosohydroxylamine, p - (1 - nitroso-2-(2,4-dinitrophenyl)hydrazino)phenyl-N-nitrosohydroxylamine and the like.

Where the benzoquinone oxime azone employed is substituted on the aryl nucleus, the products provided hereby include, for example, the sodium and other salts of compounds such as p-(1-nitrosohydrazino)-m-chlorophenyl-N - nitrosohydroxylamine, p-(1-nitrosohydrazino)-o,m'-dichlorophenyl - N-nitrosohydroxylamine, p-(1-nitroso-2-phenylhydrazino) - m - chlorophenyl-N-nitrosohydroxylamine, p-(1-nitroso-2-tolylhydrazino)-o-chlorophenyl-N-nitrosohydroxylamine, p-(1-nitroso-2-(2,4-dinitrophenyl)-hydrazino) - o,m-dichlorophenyl-N-nitrosohydroxylamine, p - (1 - nitrosohydrazino)-m-ethylphenyl-N-nitrosohydroxylamine, and so forth.

Products provided by this invention from reaction of a polycyclic quinone oxime hydrazone with nitric oxide and a base include for example the sodium and other salts of 4 - (1 - nitrosohydrazino)-naphthyl-1-N-nitrosohydroxyl-amine, 4 - (1 - nitroso-2-phenylhydrazino)-naphthyl-1-N-nitrosohydroxylamine, 9 - (1 - nitrosohydrazino)-anthryl-10-N-nitrosohydroxylamine, 7-chloro-4-(1-nitrosohydrazino)-naphthyl-1-N-nitrosohydroxylamine, and so forth.

Referring now to the quinone oxime azones which are semicarbazones, where benzoquinone oxime semicarbazone is reacted in accordance with the invention with NO and a base in which the cation is sodium, the product is the sodium salt of 1-(p-[nitrosohydroxylamino]phenyl)-1-nitrososemicarbazide. Where the thiosemicarbazone is used, the corresponding thiosemicarbazide salt will be obtained. Other compounds of this type provided hereby include, for example, the sodium and other salts of products of the reaction of ring-substituted quinone oxime semicarbazones such as 1-(p-[nitrosohydroxylamino]-m-chlorophenyl)-1-nitrososemicarbazide, and of polycyclic quinone oxime semicarbazones such as 1-(4-[nitrosohydroxylamino] - 1 - naphthyl) - 1 - nitrososemicarbazide, 1-(7 - methyl - 4 - [nitrosohydroxylamino]-1-naphthyl)-1-nitrosothiosemicarbazide, and so forth.

Where a carbohydrazone is utilized in practicing the invention, the product will be a tetranitroso compound. Thus for example, where p-benzoquinone oxime carbohydrazone forms the starting material for the practice of the invention, the reaction occurring will be as represented by the following equation:

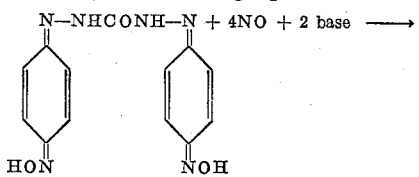

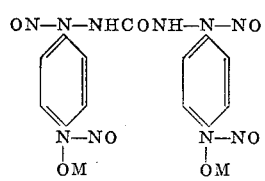

where M is the cation of the base used, and the product will be, for example, the disodium salt of 1,5-bis(p-[nitrosohydroxylamine]phenyl) - 1,5 - dinitrosocarbohydrazide. Similary, using other quinone oxime carbohydrazones, products provided hereby include the disodium and other salts of, for example, 1,5-bis(p-[nitrosohydroxylamino] - m - chlorophenyl) - 1,5 - dinitrosocarbohydrazide, 1,5 - bis(4 - [nitrosohydroxylamino] - 1-naphthyl) - 1,5 - dinitrosocarbohydrazide, and the like.

QUINONE OXIMES IN WHICH A IS A GROUP TERMINATED BY CARBON

Another group of the quinone diimines to which the reaction of this invention has been demonstrated to be applicable consists of oxime imines in which the imino substituent is an organic radical terminating in a carbon atom, of the formula HON=Aryl=NR where aryl and R are as defined above.

This group of oximes includes the o- and p-benzoquinone oxime imines, the naphthoquinone oxime imines, the phenanthraquinone oxime imines and the anthraquinone oxime imines. The more preferred members of this group are the para oxime imines, especially the p-benzoquinone oxime imines.

The stated quinone oxime imines are formed by tautomerization of o- and p-nitrosoaryl secondary amines, upon dissolving the amines in aqueous alkaline solution, that is, in an aqueous solution of a base, as illustrated by the following equation:

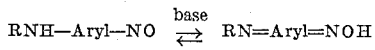

where R and aryl are as defined above. It has now been found that novel products of the type of N-nitroso-N-substituted N'-nitroso-N'-hydroxyl arylenediamines as provided by this invention can be obtained by reacting a nitrosoaryl secondary amine with a base and nitric oxide in aqueous solution. If this reaction is regarded as proceeding in two stages: (1) tautomerization of the nitrosoaryl secondary amine by the base in aqueous solution to the quinone oxime imine, and (2) reaction of the quinone oxime imine with the base and the nitric oxide to form the stated type of product, it will be evident that the reaction can be analogized to those of the quinone dioximes and quinone oxime azones discussed hereinabove. However, it is preferred to practice this species of the reaction of NO and a base with a nitrogen-containing compound to provide N-nitroso-N-substituted N'-nitroso-N'-hydroxyl arylenediamines by proceeding directly from the nitrosoaryl secondary amine, rather than by forming and isolating a quinone oxime imine, and then reacting this with nitric oxide and a base. Accordingly, in discussing this aspect of the present invention hereinafter, reference will be made to the reaction of nitrosoaryl secondary amines. It is to be understood in such discussion that the corresponding quinone oxime imines are intended to be included by mention of the nitrosoaryl secondary amine starting materials, and that the method of the invention may also be practiced by substituting such quinone oxime imines for the aryl secondary amines.

NITROSOARYL SECONDARY AMINES

The presently useful nitrosoaryl amines are secondary amines of the formula ON—Aryl—NHR where the NO and NHR groups are in the ortho or para positions relative to one another, R is as defined above, and aryl represents a benzene, naphthylene, anthracene or phenanthracene nucleus. For preparation of novel compounds as provided hereby, the said nucleus will be substituted by from 0 to 2 inert substituents, specifically chloro or lower alkyl radicals. R can be widely varied within the definition hereinabove, by the presence or absence of inert substituents, without interference with the susceptibility of the nitrosoaryl amines to conversion to novel salts by the novel reaction of this invention. For preparation of the novel salts contemplated herein from such nitrosoaryl amines, R may contain particularly from 0 to 2 substituents selected from chloro, lower alkyl, nitro and COOM' where M' represents a cation. The cation M' may be any salt-forming metal; preferably it conforms to the definition of M above.

Thus for example, the presently useful p-nitrosoanilines include those wherein the amino radical substituent is an aliphatic hydrocarbon radical, saturated or unsaturated, such as N-methyl-, N-ethyl-, N-n-propyl-, N-isopropyl-, N-isobutyl-, N-isooctyl-, N-dodecyl-, N-hexadecyl-, and N-octadecyl - p - nitrosoaniline and the like; N-vinyl-, N-allyl-, N-2-butynyl-, N-octynyl-, and N-dodecynyl-p-nitrosoaniline and the like; and N-ethynyl-p-nitrosoaniline and so forth. This group includes those in which the amino radical substituent is an alicyclic hydrocarbon radical, such as N-cyclopentyl-, N-cyclohexyl-, and N-cyclohexadienyl-p-nitrosoaniline, and so forth.

Where the amino substituent is an aromatic hydrocarbon radical, the useful p-nitrosoanilines include, for example, aryl amines such as p-nitrosodiphenylamine, N-(p-nitrosophenyl) - 4 - biphenylamine and N - (p-nitrosophenyl)naphthylamine; aralkyl amines such as N-(p-nitrosophenyl) - benzylamine, N-(p-nitrosophenyl)phenethylamine and N-(p-nitrosophenyl) 1-indanethylamine; and alkaryl amines such as N-tolyl-p-nitrosoaniline, N-methylbenzyl-p-nitrosoaniline, N-isopropylphenyl-p-nitrosoaniline, and so forth.

Where the amino radical substituent is heterocyclic, presently useful p-nitrosoanilines include for example, oxygen heterocyclics such as N-(p-nitrosophenyl)-2-p-dioxaneamine and N - (p - nitrosophenyl) furfurylamine; nitrogen heterocyclics such as N-(p-nitrosophenyl)-1-aminoacridine, and sulfur heterocyclics such as N-(p-nitrosophenyl)-3-aminothiophene.

The nitrosoaniline N substituent may also be substituted by non-interfering substituents, especially from 1 to 2 substituents such as chlorine, lower alkyl, nitro, and carboxyl salt. Thus, useful nitrosoanilines include, for example, N - (chlorononyl) - p - nitrosoaniline, N-(chlorobenzyl)-o-nitrosoaniline, and so forth.

Moreover, the nitrosaniline N substituent may be substituted by one or more nitrosoanilino radicals. Thus, presently useful nitrosoaniline derivatives include N-(nitrosophenyl) poly (secondary) amines, which may be represented by the formula

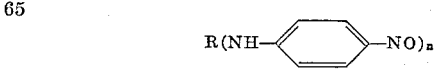

where R is a divalent radical corresponding to the radical R, terminated by carbon atoms, and $n$ is an integer of from 2 to 5. Thus for example, these aniline derivatives include aliphatic diamines such as N,N'-bis-(p-nitrosophenyl)-ethylenediamine, N,N'-bis (p-nitrosophenyl)-propylenediamine, N,N' - bis(p - nitrosophenyl) - 1,4-butylenediamine, and so forth, and also secondary diamines such as N,N'-bis(p-nitrosophenyl)-diethylenetriamine of the formula

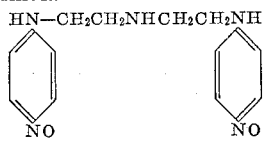

Aromatic amines are also useful, as illustrated by N,N'-bis(o-nitrosophenyl) - p - phenylenediamine, N,N' - bis (p - nitrosophenyl) - 1,4 - anthradiamine, N,N' - bis (p-nitrosophenyl) - 1,4 - naphthylenediamine, N,N' - bis(p-nitrosophenyl) - 3,3' - biphenyldiamine, and the like, as are heterocyclic amines as exemplified by N,N'-bis(p-nitrosophenyl) - 2,6 - diaminopuridine and N,N' - bis(p-nitrosophenyl) - 2,5 - diamino - 1,3,4 - thiadiazole. The radical R may also contain other linking groups, as exemplified by N,N' - bis(p - nitrosophenyl) - p,p' - sulfonyldianiline.

The novel reaction of this invention is also applicable to nitroso-substituted polycyclic aryl amines, as indicated hereinabove, corresponding to the above-illustrated aniline derivatives. Illustrative of these are N-methyl-4-nitroso - 1 - naphthylamine, N-cyclohexyl - 4 - nitroso - 1 - naphthylamine, N - chloromethyl - 4 - nitroso - 1 - naphthylamine, N-dodecyl - 4 - nitroso - 1 - naphthylamine, N-vinyl - 4 - nitroso - 1 - naphthylamine, N - ethynyl - 4 - nitroso - 1 - naphthylamine, N - methyl - 9 - nitroso - 10-anthrylamine, N - methyl - 9 - nitroso - 10 - phenanthrylamine; N - phenyl - 4 - nitroso - 1 - naphthylamine, N - benzyl - 4 - nitroso - 1 - naphthylamine, N - tolyl-4 - nitroso - 1 - naphthylamine, N - 4 - biphenyl - 4 - nitroso - 1 - naphthylamine, N - 2 - furyl - 9 - nitroso 10-anthrylamine, N - furfuryl - 4 - nitroso - 1 - naphthylamine, and so forth.

Also susceptible to the method of the invention are p-nitrosoaryl amines wherein the aromatic nucleus of the nitrosoaryl radical is substituted by from 1 to 2 atoms or radicals which are inert to nitric oxide such as chlorine atoms, alkyl groups and the like. Herein and in the claims where reference is made to a p-nitrosoaryl amine including a p-nitrosoaniline, a p-nitroso-naphthylamine, a p-nitrosoanthrylamine, or a p-nitrosophenanthrylamine without further qualification, it will be understood to include such substituted derivatives as well as the unsubstituted compounds.

Illustrative of such alkyl-substituted p-nitrosoanilines are, for example, toluidines (methylanilines) such as N-methyl-p-nitroso-m-toluidine,
N-isopropyl-p-nitroso-m-toluidine,
N-vinyl-p-nitroso-m-toluidine,
N-cyclohexyl-p-nitroso-m-toluidine,
N-phenyl-p-nitroso-m-toluidine,
N-benzyl-p-nitroso-m-toluidine, and so forth;

the xylidines (dimethylanilines) such as

N-methyl-4-nitroso-2,5-xylidine,
N-phenyl-4-nitroso-2,3-xylidine, and the like.

Similiarly, alkyl-substituted p-nitroso polycyclic aryl amines may be employed, such as
N-methyl-6-methyl-4-nitroso-1-naphthylamine,
N-(isopropylphenyl)-6,7-dimethyl-4-nitroso-1-naphthylamine, and so forth.

Referring to the halogenated nitrosoaryl amines, illustrative of these are
N-methyl-o-chloro-p-nitrosoaniline,
N-(o-chlorophenyl)-o-chloro-p-nitrosoaniline,
N-(chloronaphthyl)-7-chloro-4-nitrosonaphthyl-1-amine,
N-methyl-7-chloro-4-nitroso-1-naphthylamine,
N-methyl-2,3-dichloro-4-nitrosoaniline, and so forth.

Referring now to the products obtained from the nitrosoanilines and like secondary amine starting materials, by reaction with NO and a base in accordance with the method of the invention, the reaction which occurs is illustrated by the following equation, in which, to show the relationship of the presently discussed reaction to the other quinone oxime reactions discussed hereinabove the quinone form of the nitrosoaryl secondary amine is shown in brackets as an intermediate:

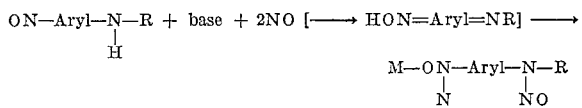

where M is the cation of the base employed, Aryl is a phenyl, naphthyl, anthracyl or phenanthracyl nucleus, and R is as defined above. The products of the reaction of the nitrosoaryl secondary amines are N-nitroso-N-substituted N'-nitroso-N'-hydroxyl o- and p-arylenediamine salts.

Thus, for example, where N-methyl-p-nitrosoaniline is reacted in accordance with the invention with NO and a base in which the cation is sodium, the product is the sodium salt of p-(hydroxylamino)-N,N'-dinitroso-N-methylaniline.

Other examples of products provided hereby from starting materials which are p-nitrosoanilines substituted by an aliphatic radical on the amino nitrogen atom include the sodium and other salts of p-(hydroxylamino)-N,N'-dinitroso-N-ethylaniline,
p-(hydroxylamino)-N,N'-dinitroso-N-isopropylaniline,
p-(hydroxylamino)-N,N'-dinitroso-N-tert-butylaniline,
p-(hydroxylamino)-N,N'-dinitroso-N-octylaniline,
p-(hydroxylamino)-N,N'-dinitroso-N-dodecylaniline, and
p-(hydroxylamino)-N,N'-dinitroso-N-hexadecylaniline;
p-(hydroxylamino)-N,N'-dinitroso-N-vinylaniline,
p-(hydroxylamino)-N,N'-dinitroso-N-ethynylaniline;
p-(hydroxylamino)-N,N'-dinitroso-N-cyclohexylaniline;
p-(hydroxylamino)-N,N'-dinitroso-N-(4-chlorobutyl)aniline,
p-(hydroxylamino)-N,N'-dinitroso-N-chloroallylaniline,
p-(hydroxylamino)-N,N'-dinitroso-N-(chlorocyclohexyl)aniline;
p-(hydroxylamino)-N,N'-dinitroso-N-methyl-m-toluidine;
p-hydroxylamino)-N,N'-dinitroso-N-methyl-m-chloroaniline, and so forth.

Exemplary of the products of reaction of p-nitrosoanilines having an aromatic nitrogen substituent are the sodium and other salts of p-(N-nitrosohydroxylamino)-N'-nitrosobiphenylamine,
p-(hydroxylamino)-N,N'-dinitroso-N-biphenylaniline,
p-(hydroxylamino)-N,N'-dinitroso-N-naphthylaniline,
p-(hydroxylamino)-N,N'-dinitroso-N-benzylaniline,
p-(hydroxylamino)-N,N'-dinitroso-N-(ethylphenyl)-aniline;
p-(hydroxylamino)-N,N'-dinitroso-N-(chlorophenyl)aniline;
p-(hydroxylamino)-N,N'-dinitroso-N-tolyl-m-toluidine,
p-(hydroxylamino)-N,N'-dinitroso-N-benzyl-m-toluidine;
p-(hydroxylamino)-N,N'-dinitroso-N-(chlorophenethyl)aniline,
p-(hydroxyamino)-N,N'-dinitroso-N-benzyl-o-chloraniline; and so forth.

Where the nitrosoaniline N substituent is a heterocyclic radical, the products include, for example, the sodium and other salts of p-(hydroxylamino)-N,N'-dinitroso-N-furanylaniline,
p-(hydroxylamino)-N,N'-dinitroso-N-pyridylaniline, and so forth.

Referring to the products of poly (p-nitrosoanilino) compounds, these include, for example, the sodium and other salts of N,N'-dinitroso-N,N'-bis(p-(nitrosohydroxylamino)phenyl)-1,2 - ethylenediamine, N,N'-dinitroso-N,N'-bis(p-(nitrosohydroxylamino)phenyl)-1,2 - propylenediamine, and N,N'-dinitroso-N,N' - bis(p-(nitrosohydroxylamino)phenyl) - diethylenetriamine; of N,N'-dinitroso-N,N'-bis(p - (nitrosohydroxylamino)phenyl) - p-phenylenediamine, N,N'-dinitroso-N,N'-bis(p-(nitrosohydroxylamino)phenyl)-1,4 - naphthalenediamine, N,N'-dinitroso-N,N' - bis(p-(nitrosohydroxylamino)phenyl)-1,4-anthradiamine, N,N'-dinitroso-N,N' - bis(p-(nitrosohydroxylamino)phenyl)-3,3'-biphenyldiamine; of N,N'-dinitroso-N,N'-bis(chloro-p - (nitrosohydroxylamino)phenyl)-1,2-ethylenediamine, and so forth.

Referring to the polycyclic nitrosoaryl secondary amines, products obtainable from these include, for example, the sodium and other salts of 4-(hydroxylamino)-N,N' - dinitroso-N-methyl-1-naphthylamine, 9-(hydroxylamino)-N,N'-dinitroso-N-methyl-10-anthrylamine, 9-(hydroxylamino) - N,N'-dinitroso-N-ethyl-10 - phenanthrylamine, 4 - (hydroxylamino)-N,N'-dinitroso-N-naphthyl-1-naphthylamine, 4-(hydroxylamino) - N,N'-dinitroso-N-phenyl-1-naphthylamine, 7-chloro-4 - (hydroxylamino)-N,N'-dinitroso-N-phenyl-1 - naphthylamino, 4-(hydroxylamino)-N,N'-dinitroso-N - chlorophenyl - 1-naphthylamine, 4-(hydroxylamino)-N,N'-dinitroso-8, N-dimethyl-1-naphthylamine, N,N'-dinitroso-N,N' - bis(4-(nitrosohydroxylamino)-1-naphthyl)-1,2-ethylenediamine.

QUINONE OXIMES IN WHICH A IS A GROUP TERMINATED BY SULFUR

As noted above, the radical A may terminate in either one of the chalcogen elements O and S. In this connection, it is to be understood that in referring to S, this includes oxidized forms of S such as

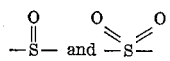

The radical joined to this terminal S will be that described hereinabove as R.

Thus presently useful compounds of the stated nature will include quinone oxime sulfonimides, such as p-benzoquinone oxime phenylsulfonimide, quinone oxime sulfinimides, such as p-benzoquinone oxime phenylsulfinimide, and quinone oxime sulfenimides, such as p-benzoquinone oxime p-chlorophenylsulfenimide. Like the above-discussed C-terminated imine substituents, however, these oximes are tautomers of the corresponding nitrosoaryl compounds, and similarly in the practice of this invention, it may be preferred to utilize a solution of the nitrosoaryl in a base whereby it is automerized to the oxime for carrying out the reaction with nitric oxide.

Exemplary of presently useful starting materials for the practice of this invention in this connection are sulfonamides such as N-(p-nitrosophenyl) phenylsulfonamide, N-(p-nitroso-chlorophenyl) phenylsulfonamide, N-(p-nitrosophenyl) o-chlorobenzylsulfonamide, N - (4-nitroso-1-naphthyl) phenylsulfonamide, N - (p-nitrosophenyl) tolylsulfonamide, N-(p-nitrosophenyl) 2-nitrophenylsulfonamide, N - (p-nitrosophenyl) naphthylsulfonamide, and so forth. Similarly, corresponding sulfinamides can be employed, such as N-(p-nitrosophenyl) phenylsulfinamide, N-(p-nitrosophenyl) chlorophenylsulfinamide, N - (p-nitroso-o-methylphenyl)phenylsulfinamide, and so forth.

Illustrative of useful nitrosoarylsulfenamides in this connection are ortho- and para-nitroso aryl sulfenamides such as N-(p-nitrosophenyl) phenylsulfenamide, N-(p-nitrosophenyl) dichlorophenylsulfenamide, N - (p-nitrosophenyl) chlorophenylsulfenamide, N-(o-nitrosophenyl) phenylsulfenamide, N-(4-nitrosonaphthyl)tolylsulfenamide, N-(p-nitrosophenyl)-4-nitrophenylsulfenamide, N-(o-chloro-p-nitrosophenyl)-methylsulfenamide, and so forth.

The conversion of the stated quinone diimines and their tautomers to products as presently provided is illustrated by the following equation

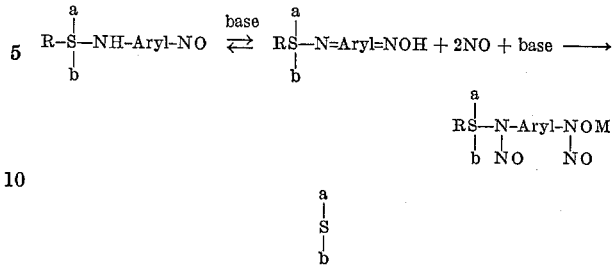

represents a sulfur atom which may or may not be oxidized and the meaning of the other symbols is as stated above. The products are N-nitroso-N-[p-(nitrososodiohydroxylamino) aryl] sulfonamides, sulfinamides and sulfenamides, and like salts.

Thus for example, illustrative of products of reaction of quinone oxime sulfonimides and sulfinimides with NO and a base as provided hereby are N-nitroso-N-[p-(nitrososodiohydroxylamino)phenyl] - phenylsulfonamide, N-nitroso - N - [p-(nitrososodiohydroxylamino) phenyl] tolylsulfonamide, N-nitroso-N-[p-(nitrososodiohydroxylamino)phenyl] p-chlorophenylsulfonamide, N-nitroso-N-[p-(nitrososodiohydroxylamino)phenyl] phenylsulfinamide, N-nitroso-N-[p-(nitrososodiohydroxylamino)phenyl] naphthylsulfonamide, N-nitroso-N-[p-(nitrososodiohydroxylamino)naphthyl] phenylsulfonamide and so forth. Illustrative of the hydroxylamine salts obtainable from the quinone oxime sulfinimides or their tautomeric precursors, nitrosoaryl sulfenamides, are the following: N-nitroso-N-[p-(nitrososodiohydroxylamino) phenyl] phenylsulfenamide, N-nitroso-N-[p-(nitrososodiohydroxylamino)phenyl] tolylsulfenamide, N-nitroso-N-[p-(nitrososodiohydroxylamino)phenyl] p-chlorophenylsulfenamide, N-nitroso-N - [p-(nitrososodiohydroxylamino)] 4-chlorobutylsulfenamide, N-nitroso-N-[p-(nitrososodiohydroxylamino) - o - chlorophenyl] phenylsulfenamide, N-nitroso-N-[p-(nitrososodiohydroxylamino) naphthyl] phenylsulfenamide, and the like.

THE QUINONES WHERE Y IS C

As noted above, in the practice of this invention, it has been found that the conversion of quinone oxime to an N-nitroso-hydroxylamine salt by reaction with nitric oxide and a base can also be effected with quinoidal oximes of the formula

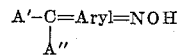

In the stated formula, A' and A" are the two radicals A required to satisfy the valence of C. In this connection, A is preferably an electron-withdrawing radical. These include as organic radicals, aryl radicals terminated by an aromatic hydrocarbon, such as phenyl, nitrophenyl, and so forth. Thus A' and A" may represent an aryl radical containing from 1 to 3 benzenoid rings, and may be a hydrocarbon radical or a hydrocarbon radical interrupted by hetero atoms including O, N and S or such a radical carrying an inert substituent of the type named above. Generally, the radical A' will contain up to 18 carbon atoms. For preparation of novel compounds as provided herein, it is preferred that the aryl radical A' contain from 1 to 2 substituents selected from chlorine, nitro, carboxyl salt COOM' where M' is a salt-forming cation as defined above, preferably the cation M as defined above, as an aromatic substituent, and lower alkyl.

A second group of electron-withdrawing radicals which either of A' and A" may represent in this connection are strongly electron-withdrawing radicals, such as cyano, —CN, nitro, —NO₂, carboxyl, —COOH, carboxyl salt, —COOM' where M' is as defined above, and carboxyl ester, —COOR, where R is as defined hereinabove, and sulfonyl radicals such as the tosyl radical. Preferably, in this instance, R is a lower alkyl radical.

Preferably, one of A′ and A″ is an aryl radical, preferably monocyclic, and having from 0 to 2 inert ar-substituents such as chloro or nitro, and the other of A′ and A″ is cyano.

Aryl represent a benzene, naphthylene, anthracene or phenanthracene nucleus, unsubstituted or substituted by from one to two chlorine atoms or lower alkyl radicals, as defined above. Preferably it is monocyclic.

These starting materials are designated substituted methylene quinone oximes. Thus for evample, the benzoquinone oxime of this type having the formula

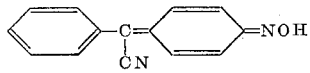

is designated phenylcyanomethylene 1,4-benzoquinone oxime. Illustrative of other presently useful methylene quinone oximes are p-chlorophenylcyanomethylene 1,4-benzoquinone oxime, p-methoxyphenylcyanomethylene 1,4-benzoquinone oxime, p-nitrophenylcyanomethylene 1,4-benzoquinone oxime, phenylcyanomethylene 1,4-naphthoquinone oxime, phenylnitromethylene 1,4-benzoquinone oxime, phenylcarbethoxymethylene 1,4-benzoquinone oxime, p-isopropoxyphenylcarbethoxymethylene 1,4-benzoquinone oxime, the sodium salt of phenylcarboxymethylene 1,4-benzoquinone oxime, the pyridine salt of phenylcarboxymethylene 1,4-benzoquinone oxime, phenyltosylmethylene 1,4-benzoquinone oxime, (p-chlorophenyl)tosylmethylene 1,4-benzoquinone oxime, fuchsone oxime and so forth.

In accordance with this invention, it has been found that reaction of such arylmethylene quinone oximes with nitric oxide and a base produces novel nitrosohydroxylamine salts. The products are p-(arylcarbyl) aryl-N-nitrosohydroxylamine salts and are characterized by the presence of the structure

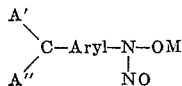

where A′ and A″ are electron-withdrawing substituents, M is a cation and aryl is a phenyl, naphthyl, anthracyl or phenanthracyl group as defined above. The nature of the radical connected to the residual C valence is at present indeterminate. There is a possibility that these novel products may be characterized as dimeric compounds wherein the carbyl carbon atom is involved in the dimeric bond, although from the lack of tendency of these compounds to decompose into free radicals, it appears that the stated carbyl carbon atom is not unsaturated. For example, the product of the reaction of phenylcyanomethylene 1,4-benzoquinone oxime with nitric oxide and sodium hydroxide corresponds to a dimer of the sodium salt of p-(α-cyanophenylcarbyl)-phenylene-N-nitrosohydroxylamine. In any case, these compounds, dimeric or not, are (arylcarbyl) aryl-N-nitrosohydroxylamine salts. Thus, reaction products provided according to this embodiment include the sodium or other salts of p-(α-cyano-ar-chlorophenylcarbyl) phenylene-N-nitrosohydroxylamine, p-(α-tosylphenylcarbyl)-phenylene-N-nitrosohydroxylamine, p-(α-cyano-ar-methoxyphenylcarbyl)phenylene-N-nitrosohydroxylamine, p-(diphenylcarbyl)phenylene-N-nitrosohydroxylamine, p-(dinaphthylcarbyl)phenylene-N-nitrosohydroxylamine, p-(diphenanthrylcarbyl) phenylene-N-nitrosohydroxylamine, p-(α-sodiocarboxy)phenylcarbyl phenylene-N-nitrosohydroxylamine, p-(α-cyano-ar-nitrophenylcarbyl) phenylene-N-nitrosohydroxylamine, and so forth.

THE ALDOXIMES

The second class of oximes particularly useful for the purposes of this invention comprises the aldoximes. The aldoximes to which the invention is especially applicable are those of the structure:

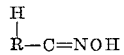

where R′ is an organic radical. Thus R may be hydrocarbon or a hydrocarbon interrupted by hetero atoms including S, N and O, and containing up to 18 carbon atoms. It may contain substituents including one or more oxime groups, as well as one or more inert substituents. In this connection inert functional groups include halogen such as chlorine and as ar-substituents or otherwise on a carbin atom devoid of hydrogen, such functional groups as nitro, cyano, keto, carboxyl (including carboxy salt and ester) and so forth. The class of novel products provided hereby include particularly products of reaction of aldoximes wherein R contains from 0 to 2 such inert substituents. Illustrative of aldoximes wherein R′ is an aliphatic radical are, for example: acetaldoxime, propionaldoxime, butyraldoxime, isobutyraldoxime, caproaldoxime, tert-octaldoxime, 2-propenaldoxime, 2,4-pentadienaldoxime, crotonaldoxime, and so forth.

Illustrative of the cyclic aldoximes are, for example, alicyclic aldoximes such as: cyclopentanecarboxaldoxime, cyclohexanecarboxaldoxime, 2-methylcyclohexanecarboxaldoxime, 2-cyclohexene-1-carboxaldoxime, cyclohexeneacetaldoxime, cyclohexenebutyraldoxime, 2,4-diethylcyclohexenecarboxaldoxime, and so forth.

The cyclic aldoximes also include aryl, alkaryl and aralkyl aldoximes including those in which the rings are heterocyclic, such as benzaldoxime, p-tolualdoxime, o-tolualdoxime, p-isopropylbenzaldoxime, 1-naphthaldoxime, 4-tert-butylbenzaldoxime, phenylacetaldoxime, 1-naphthaleneacetaldoxime, m-tolylbutyraldoxime, cinnamaldoxime, thiophene-2-aldoxime, pyridine-2-aldoxime, and so forth.

When R′ in the foregoing formula is an oxime-substituted hydrocarbon radical, the useful oximes include, for example, aliphatic polyaldoximes which are saturated like malonaldioxime and glutaraldioxime, and which are unsaturated like glutaconaldoxime, as well as cyclic polyaldioximes like phthalaldioxime and terephthaldioxime.

Aldoximes containing inert substituents adapted to produce novel products as provided hereby are illustrated by compounds such as: p-chlorobenzaldoxime, 2,5-dichlorobenzaldoxime, p-nitrobenzaldoxime, 4-chlorobutyraldoxime, 3-sodiocarboxyphenanthraldoxime, o-carbethoxybenzaldoxime, p-carbohexoxybenzaldoxime, and so forth.

The reaction which occurs when these aldoximes are subjected to the method of the invention produces 1-oximino-1-N-nitrosohydroxylamine salts (or, as they may alternatively be named, N,N′-dihydroxy-N′-nitroso amidines). It is believed that this product is formed by a two-step reaction, wherein the initial nitrosation of the aldoxime is followed by a rearrangement, as illustrated by the following equations:

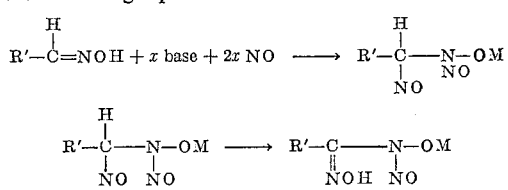

where R′ is as defined above, x is an integer corresponding to the number of oxime groups in the initial oxime, and M is the cation of the base taking part in the reaction. As will be evident, where R′ is an oxime-substituted hydrocarbon radical, the oxime group thereon will also undergo the reaction of the invention simultaneously, and the product will contain x N-nitrosohydroxylamine groups.

Additionally, and as a major product when an aliphatic aldoxime is reacted with NO and a base in a hydroxylic solvent such as methanol, the novel reaction of this invention produces a 1,1-bis(nitrosohydroxylamine) salt in accordance with the following equation

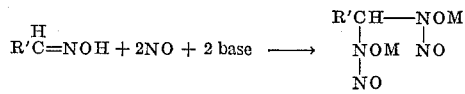

where R' is aliphatic such as alkyl. As will be evident from this equation, to the extent that there is conversion to such salts, the NO and base are consumed in an amount of 2 equivalents each for equivalent of salt formed, and where R' contains another oxime group, the consumption of NO and base will be correspondingly doubled.

Illustrative of 1 - oximino-1-(nitrosohydroxylamine) salt obtainable by the method of the invention from aldoximes are those produced from aldoximes of the stated formula where R is an alkyl radical, such as: the sodium salt of 1-oximino-1-(N-nitrosohydroxylamino) ethane (from acetaldoxime), the sodium salt of 1-oximino-1-(N-nitrosohydroxylamino)propane (from propionaldoxime), the piperidine salt of 1-oximino-1-(N-nitrosohydroxylamino)butane, the lithium salt of 1-oximino-1-(N-nitrosohydroxylamino)hexane, the sodium salt of 1-oximino-1-(N-nitrosohydroxylamino)propane, the potassium salt of 1-oximino-1-(N-nitrosohydroxylamino)-3-butyne, the ammonium salt of 1-oximino-1-(N-nitrosohydroxylamino)-2,4-pentadiene, and so forth. When R is an alicyclic hydrocarbon radical, the products of the invention include: the sodium salt of α-(N-nitrosohydroxylamino)cyclopentane - carboxaldoxime (from cyclopentane-carboxaldoxime), the sodium salt of 1-oximino - 1 - (N - nitrosohydroxylamino)-2-cyclohexylethane, the potassium salt of 1-oximino-1-(N-nitrosohydroxylamino)-4-cyclohex-1-enylbutane, and the like. Where R is a hydrocarbon radical including an aromatic ring, exemplary of the products are: the sodium salt of α-oximino-α-(N-nitrosohydroxylamino)toluene, the sodium salt of 1-oximino-1-(N-nitrosohydroxylamino)-4-m-tolyl butane, the ammonium salt of 1-oximino-1-(N-nitrosohydroxylamino)-3-phenyl 2-propene, and the like. Where it is heterocyclic, examples of these salts are the sodium salt of [oximino-(N-nitrosohydroxylamino) methylidene]-2-thiophene, [oximino (N-nitrosohydroxylamino) methylidene]-2-pyridine, and so forth. Exemplary of the products when R carries 1 to 2 inert substitutents are the sodium salt of α-oximino-α-N-nitrosohydroxylamino)-p-chlorotoluene, the sodium salt of 1-oximino-1-(N-nitrosohydroxylamino) - 4 - (o,p-dichlorophenyl)butane, the sodium salt of α-oximino-α-(N-nitrosohydroxylamino)-p-nitrotoluene, the sodium salt of α-oximino-α-(N-nitrosohydroxylamino) - p - sodiocarboxytoluene, the sodium salt of 1-oximino-1-(N-nitrosohydroxylamino)-3-carbethoxybutane, and so forth. When R is oxime-substituted, as in malonaldoxime, there are obtained products such as the disodium salt of 1,4-dioximino-1,4-di(N-nitrosohydroxylamino)butane, and the like.

Referring to the 1,1-bis(nitrosohydroxylamino) salts produced by the present novel reaction, illustrative of these are the disodium salt of 1,1-bis(N-nitrosohydroxylamino)ethane, of 1,1-bis-(N-nitrosohydroxylamino)propane, of 1,1-bis-(N-nitrosohydroxylamino)-2-propane, of 1,1-bis-(N-nitrosohydroxylamino)hexane, of 1,1-bis-(N-nitrosohydroxylamino)-4-carbethoxybutane, of 1,1-bis- (N - nitrosohydroxylamino)-3-sodiocarboxypropane, and so forth.

THE METHOD OF THE INVENTION

Considering now the method provided by this invention, this comprises, briefly stated, a process for obtaining novel salts of N-nitrosohydroxylamine compounds which comprises reacting an aldoxime or a quinone diimine or a tautomeric precursor thereof such as a nitrosoaryl secondary amine, with at least one equivalent of base and at least one equivalent of nitric oxide per oxime group.

The proportions of these reactants may vary. As to the base employed in the reaction, where the cation of the base is monovalent or where the base is monofunctional, such as piperidine, to supply an equivalent thereof with respect to the oxime will require one mole per mole of a compound containing a single oxime group. In the case of aliphatic aldoxime conversion to 1,1-bis-(nitrosohydroxylamine) salts, this amount is doubled in terms of consumption; actually it is found that such disalts are formed preferentially, even if less than the theoretical amount of base is supplied. The tautomeric precursors such as the nitrosoaryl secondary amines will be converted to the oxime-imine, and for this, in excess of an equivalent of base may be required; then as an oxime it requires one mole per mole of a compound containing a single nitroso group. As indicated in the equations shown above, this ratio will be correspondingly increased when additional oxime or nitroso groups are present in the starting material. Where the base is polyfunctional, such as ethylenediamine, then correspondingly less on a molar basis is required to provide an equivalent per oxime or nitroso group; for example, where it is difunctional, one-half mole of base constitutes an equivalent per mole of an oxime containing a single oxime group, one mole will be equivalent to a mole of a dioxime, and so forth. The base may be present in excess without interfering with the course of the reaction. Generally it will be present in slight excess over the amount theoretically required to provide an equivalent per oxime or per nitroso group, in order to insure complete reaction. If desired, it may be present in a proportion of 2 or even up to 4 times this ratio.

The number of functional groups in the initial oxime will also determine the number of moles of nitric oxide required per mole of oxime to supply an equivalent thereto. At least one molecule of nitric oxide is consumed per oxime group to produce the presently provided compounds. As indicated hereinabove, in the case of aldoximes the reaction consumes two molecules of nitric oxide per oxime group to form the oximino product, and three to form the bis(nitrosohydroxylamine) products. In the case of the quinone oximes, the reaction consumes two molecules of nitric oxide for each imine group present in a molecule. Thus, in the case of the quinone dioximes, the reaction consumes one molecule of nitric oxide per oxime group. In the case of the quinone oxime azones, it consumes one molecule of NO per oxime group and one molecule of NO per azone group. In the case of the nitrosoaryl secondary amines, it consumes one molecule of NO per nitroso group and one molecule of NO per amine group to which the nitrosoaryl group is joined; or referring to a quinone oxime imine, it would consume one molecule of NO per oxime and one molecule of NO per imine group. For the methylene quinone oximes, it will be appreciated, there being only one imine group present, as the oxime group, per quinone radical, the consumption is one mole of nitric oxide per oxime group. While the reactants will be present in at least the stated ratios, generally it is advantageous to introduce the nitric oxide in excess of the calculated equivalent to the amount of oxime present. Very large excesses, up to 10 or 20 times the calculated equivalent amount of this reagent, may be employed if desired.

The base which is employed in conducting the method of the invention may be selected from any of a wide variety of organic and inorganic bases capable of reacting with oximes to form salts. Such bases are well known to chemists and can readily be determined by simple tests. Inorganic bases particularly useful for the practice of this invention include the hydroxides of water-solubilizing cations, and especially the hydroxides of alkali metals such as sodium hydroxide and potassium hydroxide, as well as the hydroxide of a nitrogenous water-solubilizing cation like ammonium hydroxide. Organic bases comprising metallic cations particularly useful for the practice of this invention include alkylates, and especially lower alkylates such as methylates and ethylates, of water-solubilizing cations like the alkali metals, such as sodium methylate, lithium methylate, potassium ethylate and so forth. When salts of N-nitrosohydroxylamines containing an inorganic cation are to be prepared in accordance with this invention, it will generally be advantageous to use bases such as the bases containing water-solubilizing cations just mentioned, and particularly the alkali metal bases. The products obtained, containing a water-solubilizing cation, are then directly suitable for use as metal-precipitating agents in aqueous media. The salts of the N-nitrosohydroxylamines with other metallic cations such as a Group II metal like magnesium and zinc, a Group III metal like aluminum, a Group IV metal like lead, and so forth, can be prepared particularly readily by metathesis of the alkali metal salts of the N-nitrosohydroxylamines with salts of other desired metallic cations, and this will generally constitute the most advantageous method of preparing such metallic salts.

The method of the present invention may also be conducted utilizing organic bases devoid of inorganic cations. Illustrative of such bases are, for example, amines, like pyridine, piperidine, piperazine, benzyldimethylamine, c-methylbenzyldimethylamine, dimethylamine, aniline, ethylenediamine, ethylamine, diethylamine, and so forth. The salts which may be prepared using such organic bases are of particular interest when the cation is an organic nitrogen-containing base which itself is an accelerator for the curing of rubber. Examples of such bases are piperidine and piperazine. When such a salt is used in the curing of rubber, the heat employed during the curing operation is believed to liberate the organic nitrogen base, enabling it to serve as an accelerator in the curing operation.

The reaction with the base and nitric oxide in accordance with the present invention will ordinarily be carried out in a medium comprising a solvent or diluent. In one embodiment of the invention, the solvent or diluent employed as the reaction medium will be organic. Bases which are at least partly organic, such as sodium methylate, lithium methylate, piperazine, ethylamine, and so forth, are conveniently selected as reactants in this embodiment of the invention. Any of a wide variety of organic non-polar solvents may be employed as reaction media. Thus, for example, benzene and heptane are adapted for this use. Ethers such as diethyl ethers and similar oxy compounds such as dioxane may alternatively be employed, as well as dimethylformamide and such chlorinated compounds as carbon tetrachloride, ethylene dichloride and so forth. Methanol is a useful polar solvent; unlike other hydroxylated solvents, it does not react with NO. Generally methanol provides an inert solvent for conducting the present reactions, but with the aliphatic aldoximes, it affects the course of the reaction as noted above. At least several different products can be isolated from the reaction mixture by fractional precipitation, a major product then being the 1,1-bis-(nitrosohydroxylamino) salt as noted above.

In an alternative embodiment of the method of the invention, the reaction medium will be an aqueous medium. Where the starting material is a nitrosoaryl secondary amine, this is generally essential. In an organic solvent medium, it has been found, the reaction product is usually a diazo compound, rather than the presently provided novel N-nitroso-N-substituted N'-nitroso-N'-hydroxyl p-arylenediamines. Similarly water is preferred as the reaction medium for the quinone oxime imines tautomeric with these amines. However, conversely N-ethyl-4-nitroso-1-naphthylamine was found to give no product in an eqous medium, while in methanol it gave the expected N,N'-dinitroso-N-hydroxylamine salt. In the case of the quinone diimines and aldoximes, use of an aqueous medium is optional, but may be advantageous.

It has been found that quite high yields of the presently provided novel products can be obtained when the method of this invention is conducted using water as the reaction medium. This embodiment of the invention may be particularly advantageously employed in large scale production. Bases which are inorganic, like sodium hydroxide, can be used conveniently as reactants in this embodiment of the invention.

In order for the reaction of the nitric oxide with the oxime to proceed it is essential that it be carried out in an oxygen-free atmosphere. To accomplish this, the reaction mixture comprising the oxime and base, together with the solvent or diluent, will be placed in a gas-tight container such as an autoclave and the system purged of air, as by flushing with an inert gas such as nitrogen. Nitric oxide can then be introduced into the reaction mixture and the reaction allowed to proceed. Usually undiluted nitric oxide gas will be employed, but where desired, it may be admixed with inert gaseous diluents.

The method of the invention can be conducted at atmospheric, subatmospheric or superatmospheric pressure. Pressures as low as 400 mm. of mercury may be employed, and any pressure above this can be utilized. Since nitric oxide is a gas, it will ordinarily be convenient to operate at superatmospheric pressure. The progress of the conversion of the starting material to the product of this invention can then be followed by observing the decrease in pressure as the nitric oxide is consumed in the reaction: when the pressure no longer decreases, but remains constant, the conversion of the reaction mixture will be complete. Generally pressures in the range from about 1 to about 30 atmospheres will be found advantageous when an ordinary chemical autoclave is used. When desired, however, much higher pressures, for example, up to 1000 pounds per square inch or more can be utilized.

Generally quite moderate temperatures are sufficient to effect the formation of N-nitrosohydroxylamine salts by the method of the invention. Indeed, many of the reactions are exothermic under the conditions stated, and cooling may even be required to moderate the rate of the reaction. Thus temperatures below 0° C. may sometimes be used. Where the reaction is exothermic, generally the heat of reaction developed in the reaction mixture will produce appropriate conditions for the reaction. With less reactive starting materials, heating may be employed if desired. In such case, the temperature may range as high as necessary to produce the desired rate of reaction so long as it is maintained below the decomposition temperature of the reactants. Generally, temperatures above 100° C. are unnecessary.

On completion of the reaction, the novel products of this invention may be isolated simply by usual techniques. For example, where the base employed is such as to produce compounds which are salts of sodium or other alkali metals as the product, such salts will generally be insoluble in the reaction mixture and can be separated therefrom by simple filtration of similar mechanical separating means. Insoluble organic salts can be separated in the same manner, and salts soluble in the reaction medium can be separated by evaporation of the solvent.

The salts which are formed as products of the present method can readily be subjected to metathesis with another salt to convert them to salts of different cations. In this way salts of any desired metal, including salts of titanium, vanadium, chromium, manganese, iron, cobalt, nickel, copper, zinc, and the like, can be prepared.

The salts of the present invention, as stated, are particularly useful as curing agents for the curing of polychloroprene under acid conditions and of acidic rubbers. In such case, a salt of the present invention is included in the unvulcanized rubber stock, and the mixture then subjected to heat and pressure in accordance with conventional rubber vulcanization principles. Advantageously, in addition to any acidic carbon black or filler that may be present, there is also included in the rubber composition a free acid or a latent, acid-liberating material. The free acid may be any inorganic or organic (carboxylic or sulfonic) acid, such as hydrochloric, hydrobromic, sulfuric, salicyclic, benzoic, benzene sulfonic, p-toluene sulfonic, and the like acids. Latent, acid-liberating materials that may be used are substances that liberate acid only upon reaching temperatures employed during curing. Particularly advantageous materials in this regard are the so-called molecular sieves which are synthetic metallo alumino silicates, usually in powdered form, the particles having a size of 1–3 microns in diameter, with minute holes therein permitting the absorption of acid molecules smaller than 5 angstroms in diameter. Such sieves absorb acid at low temperature and liberate the acid at the temperatures employed during the curing operation. The acid absorbed may be of the types mentioned above in this paragraph.

Salts provided by this invention can also be used to cure rubbers which are basic and neutral, and under basic and neutral conditions. In this connection, the useful salts are those of the aryl bis(N-nitrosohydroxylamines) with amines and with metals having a standard oxidation potential at least as low as that of silver which is —0.799. Illustrative of these amine salts are the salts with triethylamine, di-n-propylamine, piperazine, piperidine, and so forth. Illustrative of the stated metals are silver, mercury, platinum, palladium, tellurium and gold; and under proper redox conditions, salts with metals of higher oxidation potential can be used. As in the case of acidic rubbers and acid conditions, the salt will be included in the unvulcanized stock, and the resulting mixture will be subjected to heat and pressure as conventional in rubber vulcanization. Carbon blacks included in the mixtures may be basic or neutral, or may be acidic. Basic fillers such as zinc oxide, magnesium oxide and so forth may be included in the rubber mixes, whereby the mixes are rendered basic.

The amount of the product of the present invention used as curing agent may range from about 0.5% to about 4%, by weight, based on the weight of the rubber.

THE ETHERS

As noted hereinabove, this invention also provides ethers of aryl N,N'-dinitroso N-hydroxyl diamines.

These ethers can be prepared from the novel salts of such aryl diamines as herein provided, and reference may be made to the preceding discussion for a disclosure of these salts. The salts useful for the preparation of those ethers include salts of aryl N,N'-dinitrosodihydroxylamines, as derived from aromatic dioximes in the manner described herein, having the general formula

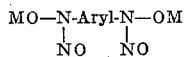

where M is a cation and aryl is a phenyl, naphthyl, anthracyl or phenanthracyl nucleus, unsubstituted or substituted by from 1 to 2 Cl atoms or lower alkyl radicals. They also include aryl N,N'-dinitroso N-substituted N'-hydroxyl diamines, of the general formula

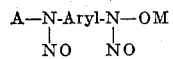

where A, aryl, and M are as defined hereinabove. Here A is a substituent other than OM, such as, for example, the radical R, where R is as defined above.

By reacting such salts with a cation-displacing alkylating agent, formation of the ethers is effected. Using an organic halide as such an agent, treatment of the salts therewith displaces the cation of the salt by the organic radical of the halide, thereby forming the ether. In such a reaction, use of a salt of a metal forming an insoluble halide assists in driving the reaction. Illustrative of such salts are silver, tellurium, palladium and so forth. Thus use of such salts may be preferred in the present connection. As examples of such salts may be mentioned, for example, the di-silver salt of p-phenylene-N,N'-dinitrosodihydroxylamine, the di-silver salt of o-chloro-p-phenylene-N,N'-dinitrosohydroxylamine, the silver salt of p - (N - nitrosohydroxylamino)-N'-nitrosobiphenylamine, the silver salt of 4 - (hydroxylamino) - N,N'-dinitroso-N-methyl-1-naphthylamine, and so forth.

Referring to the organic halides which can be reacted with such salts to provide the presently provided ethers, these may be aliphatic or aromatic, including cyclic and heterocyclic. Illustrative of these reactants are methyl iodide, isobutyl bromide, 6-dodecenyl iodide, bicyclopentylmethyl iodide, benzyl chloride, 2-piperidylethyl iodide, 4-naphthyl butyl bromide, and so forth. Generally, these halides will conform to the formula RX' where R is as defined hereinabove and X' is a halogen atom such as Cl, Br or I. R may be substituted by inert radicals as hereinabove defined, so that presently useful halides include, for example, p-chlorobenzyl iodide, 2-nitrocyclohexylmethyl chloride, o,p-dichlorobenzyl iodide, and so forth.

The reaction by which ethers are prepared as stated may be represented by the following equation:

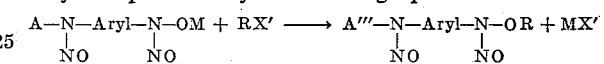

where A, aryl, M, R and X' are as defined above, and A''' is OR when A is OM and A when A is other than OM.

Thus the diethers are produced when the aryl nitrosohydroxylamine is a bis(nitrosohydroxylamine) di-salt, and also when it is a salt of a bis (nitrosohydroxylamine) mono-salt mono-ether. For example, these include the dimethyl diether of p-phenylene-N,N'-dinitrosodihydroxylamine, the diethyl ether of 1,4-naphthlene-N,N'-dinitrosodihydroxylamine, the methyl isobutyl ether of p-phenylene-N,N'-dinitrosodihydroxylamine, the dibenzyl ether of o-chloro-p-phenylene-N,N'-dinitrosodihydroxylamine, the dipropyl ether of 2-methyl-1,4-naphthylene-N,N'-dinitrosodihydroxylamine, the bis(p-chlorobenzyl) ether of p-phenylene-N,N'-dinitrosodihydroxylamine, and so forth.

Monoethers available in accordance with this invention from aryl nitrosohydroxylamines include ester ethers such as, for example, the acetic monoester methyl monoether of p-phenylene-N,N'-dinitrosodihydroxylamine, the benzoic monoester isobutyl monoether of p-phenylene-N,N'-dinitrosodihydroxylamine, and so forth.

These presently provided monoethers also include ethers of the formula

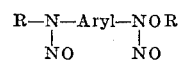

such as the methyl ether of p-(hydroxylamino)-N,N'-dinitroso-N-methylaniline, the isobutyl ether of p-(hydroxylamino) - N,N' - dinitroso - N - (4 - chlorobutylaniline), the benzyl ether of p-(N-nitrosohydroxylamino)-N'-nitrosobiphenylamine, the p-nitrobenzyl ether of p-(hydroxylamino) - N,N' - dinitroso - N - tolyl - m-toluidine, the 2-furanylmethyl ether of N,N'-dinitroso-N,N'bis(p - (nitrosohydroxylamine)phenyl) - 1,2 - ethylene diamine, the methyl ether of 4-(hydroxylamino)-N,N'-dinitroso-N-methyl-1-naphthylamine and so forth.

Additionally, other monoethers corresponding to salts as hereinabove are provided, such as the methyl ether of p - (1 - nitrosohydrozino)phenyl - N - nitrosohydroxylamine, the methyl ether of 1-(p-(nitrosohydroxylamino) phenyl)-1-nitrososemicarbazide, the 4-chlorobutyl ether of N - nitroso - N - (p - (nitrosohydroxylamino)phenyl) phenylsulfonamide, the benzyl ether of N-nitroso-N-(p-(nitrosohydroxylamino) - naphthyl)phenylsulfenamide, and so forth.

Referring to the preparation of the stated ethers, a procedure which may be followed comprises simply contacting the selected salt with the selected organic halide.

Considering one equivalent of the salt as one mole divided by the number of nitrosohydroxylamine salt groups per molecule, a ratio of one mole of the organic halide to one equivalent of salt supplies the theoretical ratio. Either the salt and the halide may be present in excess, such as a 2-5 times excess, of the theoretical ratio for the reaction, if desired. Generally it will be desirable to conduct the reaction in a solvent or diluent medium; for this purpose strongly polar solvents such as methanol, isobutanol, dimethylformamide and the like are preferred. The reaction mixture should be anhydrous. The temperature of reaction may range up to any temperature below the decomposition temperatures of the reactants. Conveniently, the reaction is allowed to take place at room temperature. Sub-, super- or ordinary atmospheric pressures may be used. As noted above, the reaction is desirably driven by selecting a salt having a cation forming an insoluble halide, and on completion of the reaction, this will be separated and the product can be recovered from the filtrate by usual techniques, such as evaporating off the solvent.

The invention is further illustrated by the following examples which are to be understood to be illustrative and not limiting.

*Example I*

To a solution prepared by dissolving 54 g. of sodium methoxide in 250 cc. of methanol is added 69 g. of p-benzoquinone dioxime. The resulting solution is cooled to about 4° C. and added to a 1-liter autoclave. The autoclave is closed and flushed with nitrogen. Nitric oxide, purified by passage through a sodium hydroxide trap, is admitted to the autoclave to produce a pressure therein of 90 pounds per square inch gauge (p.s.i.g.). Additional nitric oxide is added intermittently to the autoclave to maintain the pressure at this level until, after 6-8 minutes, the pressure no longer decreases, indicating that the reaction has ceased. In the course of this addition of nitric oxide, the temperature of the reaction mixture rises to about 20° C. When the pressure has ceased dropping, the excess nitric oxide is removed from the system, reducing it to atmospheric pressure. The system is then flushed thoroughly with nitrogen. After this the autoclave is opened and the reaction mixture filtered. The filter cake is washed with methanol and air dried. The yield is 110 g. of disodium p-phenylene-N,N'-dinitrosodihydroxylamine (the disodium salt of p-phenylene-di-N-nitrosohydroxylamine).

*Example II*

A sodium methoxide solution is prepared in a reaction flask from 0.52 g. (0.02 g. atoms) of sodium methoxide and 10 ml. of methyl alcohol. To this is added a solution of 1.38 g. (0.01 mole) of p-benzoquinone dioxime in 10 ml. of methyl alcohol. The reaction flask is cooled to −80° C. and the system freed of air by evacuating the system, filling it with nitrogen and again evacuating to approximately 0.5 mm. of mercury. The system is then pressurized to 800 mm. Hg with nitric oxide and the reaction mixture is stirred at 0± 2° C. On completion of reaction, the nitric oxide is removed, the reaction mixture is filtered, and the filter cake is washed with methanol and dried. The yield is 2.35 g. of disodium p-phenylene-N-N'-dinitrosodihydroxylamine. Calculated analysis for $C_6H_4N_4O_4Na_2$: C, 29.76; H, 1.66; N, 23.14; Na, 19; that found is: C, 29.57; H, 1.74; N, 22.88; Na 19.36.

Proceeding similarly, the corresponding o-phenylene disodium salt is prepared. It can be precipitated as the disilver salt by treating the disodium salt with silver nitrate in aqueous solution. Calculated for $C_6H_4Ag_2N_4O_4$: Ag, 52.9. Found: Ag, 53.3.

*Example III*

To convert the disodium salt of Example II to the corresponding zinc salt, it is dissolved in water, and zinc acetate is added in the form of an aqueous solution. The zinc salt of p-phenylene-N,N'-dinitrosodihydroxylamine precipitates and is filtered off, washed, dried and passed through a 200 mesh sieve.

Stock for vulcanization is prepared by combining 100 parts of polychloroprene stock with 4 parts of the zinc salt prepared as described immediately above and 40 parts of carbon black. The stock is cured by holding it for 30 minutes at 307° F. The properties of the resulting cured rubber are as follows: tensile, 2680 p.s.i.; elongation, 400%; 1800 p.s.i. at 300% modulus.

Similar results are obtained substituting the sodium salt for the zinc salt employed as described as curing agents.

The products of the present invention may also be employed as curing agents for other acid rubbers, such as carboxylic acid rubbers like polymers of acrylonitrile, butadiene and polyacrylic or polymethacrylic acid, and rubbers prepared by partial hydrolysis of acrylonitrile-butadiene copolymers to introduce acrylic acid groups in the molecule.

Different salts may be obtained by following substantially the same procedure as described above for the preparation of the zinc salt. Thus, to prepare a lead salt, the disodium salt of Example II is added to a slightly acidic solution of lead acetate. The precipitate formed was filtered, washed, and dried to provide the lead salt of p-phenylene-N,N'-dinitrosodihydroxylamine. Calculated analysis of this salt is: C, 17.86; H, 0.99; Pb, 51.3; that found is: C, 17.39; H, 1.99; Pb, 51.09.

*Example IV*

The disodium salt prepared as described in Example II is dissolved in water and the resulting aqueous solution added to solutions of various ions as indicated hereinbelow. Precipitates are obtained which are characterized as follows:

| Ion: | Color of precipitate |
|---|---|
| $Cu^{++}$ | Blue. |
| $Fe^{++}$ | Rust. |
| $Ni^{++}$ | Green. |
| $Co^{++}$ | Orange. |

*Example V*

Seventy grams of p-benzoquinone dioxime and 86.2 g. of piperazine are dissolved in 500 ml. of absolute methanol at room temperature. This solution is charged into a one liter autoclave which is then purged free of air with nitrogen. The autoclave is charged with nitric oxide to a pressure of 100 p.s.i.g. continuously until the reaction is complete as observed by no further decrease in pressure. One mol of nitric oxide is consumed per one-half mol of p-benzoquinone dioxime. The autoclave is then flushed with nitrogen to remove excess nitric oxide, and the contents filtered. The solid residue is reached and dried with methanol to give 216 g. of piperazino p-phenylene-N,N'-dinitrosodihydroxylamine.

Infrared analysis shows a structure similar to that of disodium p-phenylene-N,N'-dinitrosodihydroxylamine. The calculated analysis is: C, 42.25; H, 5.6; and N, 29.6; that found is: C, 42.29; H, 5.65; and N, 29.5.

*Example VI*

The salt of Example V is used to cure a polychloroprene stock prepared from 100 parts, by weight, of polychloroprene (GNA), 50 parts of furnace black (acidic), 10 parts of mineral oil and 2 parts of phenyl-beta-naphthylamine. Four parts of piperazine salt and 1 part of salicylic acid are included in the stock. The stock is cured at 288° C. for 20 minutes to give a tensile of 1680 p.s.i. Using the same recipe but without the salicylic acid a cure of 30 minutes at 308° F. gives a tensile of 2000 p.s.i.

*Example VII*

Otherwise following the procedure of Example V, 70 g. of p-benzoquinone dioxime and 85.2 g. of piperidine dissolved in 500 ml. of methanol at room temperature are reacted with nitric oxide under a pressure of 100 p.s.i.g. to give 204 g. of dipiperidine p-phenylene-N,N'-dinitrosodihydroxylamine. The calculated analysis is: C, 52.16; H, 7.66; N, 22.81; that found is: C, 52.36; H, 7.63; N, 22.97.

*Example VIII*

The dipiperidine salt of Example VII is used to cure polychloroprene using a stock composed of 100 parts of polychloroprene (GNA), 50 parts of furnace black (acidic), 10 parts of mineral oil, 2 parts of phenyl-beta-naphthylamine and 4 parts of the dipiperidino salt. The stock is cured at 307° F. for 30 minutes to give a tensile of 1840 p.s.i.

*Example IX*

Otherwise following the procedure of Example V, but using a 250 ml. autoclave, 6 g. of thymolquinone dioxime and 1.64 g. of sodium methoxide dissolved in 50 ml. of methanol at room temperature are reacted with nitric oxide under a pressure of 60 p.s.i.g. to give 8.9 g. of disodium 3-isopropyl-6-methylphenylene-N,N'-dinitrosodihydroxylamine.

*Example X*

Otherwise following the procedure of Example IX, 4.6 g. of 9,10-anthraquinone dioxime and 1.05 g. of sodium methoxide dissolved in 50 ml. of methanol at room temperature are reacted with nitric oxide (60 p.s.i.g.) to give 5.3 g. of disodium 9,10-anthracene-N,N'-dinitrosodihydroxylamine.

*Example XI*

Otherwise following the procedure of Example IX, 4.6 g. of 9,10-phenanthraquinone dioxime and 1.05 g. of sodium methoxide dissolved in 50 ml. of methanol at room temperature are reacted with nitric oxide (60 p.s.i.g.) to give 5.2 g. of disodium 9,10-phenanthracene-N,N'-dinitrosodihydroxylamine.

*Example XII*

To a suspension of 10.8 g. of sodium methylate and 200 ml. of n-heptane is added 24.4 g. (0.2 mole) of benzaldoxime. The mixture is shaken and cooled in a Dry Ice bath. The reaction flask is then flushed with nitrogen, after which nitric oxide is admitted under pressure, and the procedure followed subsequently is as described in Example I. The product is a white solid which, after filtration and drying, weighs 37 g. The calculated analysis for $C_7H_6N_3O_3Na$ is: C, 41.4; H, 2.95; N, 20.7; Na, 11.38; that found is: C, 41.35; H, 3.07; N, 20.1 and Na, 11.03. The structure of the compound is

which represents the sodium salt of α-(N-nitrosohydroxylamino)benzaldoxime.

*Example XIII*

A reaction mixture is prepared by adding 87 g. (1 mole) of butyraldoxime to a suspension of 1 mole of sodium methylate in 500 ml. of n-heptane. A white solid separates from the reaction mixture. The slurry is added to an autoclave and the reaction mixture treated with nitric oxide as described in Example I, using a nitric oxide pressure of 100 p.s.i. On completion of the reaction, after the autoclave has been flushed, the reaction mixture is filtered, and the filter cake washed with methanol. There is thereby obtained 120 g. of the sodium salt of 1-oximino-1-(N-nitrosohydroxylamino)-n-butane:

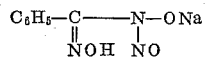

The calculated analysis for $C_4H_8N_3O_3Na$ is: C, 28.4; H, 4.73; N, 24.9; that found is: C, 28.37; H, 4.51; N, 24.4.

When butyraldoxime is dissolved with an equimolar amount of sodium methylate (sodium methoxide) in methanol and the cooled solution is pressured to 60 p.s.i., with nitric oxide, at least three products can be isolated from the reaction mixture by fractional crystallization, and a major product is the disodium salt of butane-1,1-bis(N,N'-dinitrosodihydroxylamine). The above-identifide oxime separates as a white precipitate from the reaction mixture spontaneously on standing. When the filtrate is mixed with an equal volume of ether, a greyish precipitate is produced. This is the disodium salt of butane-1,1-di(N-nitrosohydroxylamine). Recrystallized from a water-acetone mixture, it analyzes correctly for the monohydrate of the stated salt, and infrared analysis confirms this structure. The filtrate from its precipitation on concentration gives a third product, which is a greenish solid, not further identified.

*Example XIV*

A mill batch is prepared having the following composition in parts by weight:

| | |
|---|---:|
| Polychloroprene | 100 |
| Stearic acid | 1 |
| Acidic carbon black (Statex B, supplied by Columbian Carbon Co.) | 40 |
| Paraflux 2016 (a saturated polymerized hydrocarbon plasticizer, sp.g. 1.2, supplied by C. P. Hall Co.) | 9 |
| Petrolatum | 1 |
| N-phenyl-β-naphthylamine (antioxidant, Neozone D, supplied by E. I. du Pont de Nemours Co.) | 2 |
| Liquid soap lubricant (Latex Lube GR, supplied by DuBois Chemical Co.) | 1 |
| Salicylic acid | 1.5 |
| Product of Example XIII | 4 |

The foregoing ingredients are milled together and cured 30 minutes at 307° F. There is thereby obtained a cured, closed cell foam.

*Example XV*

The reaction mixture is prepared by adding 0.2 gram mole of isobutyraldoxime to a mixture of 0.2 gram mole of sodium methylate and 100 ml. of n-heptane. The mixture is warmed to about 35° C. and shaken under an atmosphere of nitric oxide at 60 p.s.i. The resulting white precipitate is filtered off and dried. This yields 26 g. of the sodium salt of 1-oximino-1-(N-nitrosohydroxylamino)-isobutane. The calculated analysis for $C_4H_8N_3O_3Na$ is: C, 28.41, H, 4.73; N, 24.9; that found is: C, 27.34; H, 4.62, N, 24.5.

This is also a foaming agent, like the product used in Example XIV.

*Example XVI*

14.7 g. of cinnamaldoxime and 5.4 of sodium methoxide are dissolved in 100 ml. of n-heptane. This solution is charged into a 250 ml. autoclave which is then purged free of air with nitrogen. The autoclave is then charged with nitric oxide to 60 p.s.i.g. nitric oxide pressure continuously until no further decrease in pressure is observed. The temperature reaches 55° C. The autoclave is then cleared of nitric oxide with nitrogen, and the contents filtered. The residue is washed and dried with methanol to give 21 g. of the sodium salt of 1-N-nitrosohydroxylamino cinnamaldoxime. The calculated analysis is: C, 47.1; H, 3.49; N, 18.3 and Na, 10.04; that found is: C, 44.5; H, 3.39; N, 17.5 and Na, 10.11.

*Example XVII*

Otherwise following the procedure of Example XVI, 8.1 g. of p-isopropylbenzaldoxime and 8.3 g. of sodium methoxide dissolved in 200 ml. of n-heptane are reacted with nitric oxide under 60 p.s.i.g. pressure. The temperature reaches 45–50° C. There results 14.3 g. of the sodium salt of 1-N-nitrosohydroxylamino p-isopropylbenzaldoxime.

Example XVIII

Otherwise following the procedure of Example XVI, 7.3 g. of p-chlorobenzaldoxime and 2.7 g. of sodium methoxide dissolved in 100 ml. of methanol are reacted with nitric oxide under 60 p.s.i.g. nitric oxide pressure. The temperature reaches 65° C. There results 17.4 g. of the sodium salt of 1-N-nitrosohydroxylamine p-chlorobenzaldoxime. Calculated analysis is: C, 35.37; H, 2.12; N, 17.68; Na, 9.67; Cl, 14.95; that found is: C, 35.16; H, 1.98; N, 16.72; Na, 9.88; Cl, 15.18.

Example XIX

Otherwise following the procedure of Example XIV 12.7 g. of thiphene-2-aldoxime and 5.4 g. of sodium methoxide dissolved in 100 ml. of n-heptane are reacted with nitric oxide under 60 p.s.i.g. nitric oxide pressure. The temperature reaches 70° C. There results 19.0 g. of the sodium salt of 1-N-nitrosohydroxylamino thiophene-2-aldoxime. Calculated analysis is: C, 28.70; H, 1.93; N, 20.09; Na, 10.99; that found is: C, 28.32; H, 2.38; N, 19.99; Na, 10.56.

Example XX

Otherwise following the procedure of Example XVI, 12.2 g. of pyridine-2-aldoxime and 5.4 g. of sodium methoxide dissolved in 100 ml. of benzene are reacted with nitric oxide under 60 p.s.i.g. nitric oxide pressure. The temperature reaches 70° C. There results 12.0 g. of the sodium salt of 1-N-nitrosohydroxylamino pyridine-2-aldoxime.

Example XXI

Otherwise following the procedure of Example XVI, 10.4 g. of terephthaldioxime and 5.4 g. of sodium methoxide dissolved in 100 ml. of methanol are reacted with nitric oxide under 60 p.s.i.g. nitric oxide pressure to give 15.3 g. of the disodium salt of N,N'-dinitrosodihydroxylamino terephthaldioxime.

Example XXII

Otherwise following the procedure of Example XVI, 6.5 g. of glutaraldioxime and 5.4 g. of sodium methoxide dissolved in 100 ml. of methanol are reacted with nitric oxide under 60 p.s.i.g. nitric oxide pressure to give 13.0 g. of disodium - N,N'-dinitrosodihydroxylamino glutaraldoxime.

Example XXIII

A reaction mixture is prepared by adding 13.8 g. (0.1 mole) of p-benzoquinone dioxime, with stirring, to a solution of 8.0 g. (0.2 mole) of NaOH in 100 ml. of water. A Paar apparatus equipped with a stainless steel reservoir is thoroughly flushed with dry nitrogen, and then this reaction mixture is introduced into the apparatus and it is pressured with 60 p.s.i.g. of nitric oxide. Twenty p.s.i. (0.2 mole) of the nitric oxide are absorbed within 40 minutes. The reddish-brown solid precipitate formed is removed and dried. The infrared spectrum of this material is identical with that of an authentic sample of disodium p - phenylene - N,N' - dinitrosodihydroxylamine. The dried precipitate weighs 21. g., which is equivalent to a yield of 87.5%.

Example XXIV

The procedure described in Example XXIII is repeated using the aqueous mother liquor produced in the procedure of Example XXIII as the reaction medium. The product obtained weighs 23.1 g., which represents a 96.3% yield.

Example XXV

The disodium salt of p-phenylene-N,N'-dinitrosodihydroxylamine prepared in an aqueous reaction medium as described in Examples XXIII and XXIV is converted to the corresponding zinc salt (61% yield) by slurrying or dissolving 0.1 mole of the disodium salt in water and adding an aqueous solution of 0.2 mole of zinc acetate to this.

To prepare the magnesium salt of p-phenylene-N,N'-dinitrosodihydroxylamine, an aqueous solution of 0.2 mole of magnesium sulfate is added to such an aqueous slurry of the disodium salt. The magnesium salt precipitates out and is isolated by filtration and drying. The yield is 43.0 g. (80% yield).

The aluminum salt is prepared similarly, substituting aluminum sulfate for the magnesium sulfate. It is a light tan solid, insoluble in water.

Example XXVI

To a solution of 2.7 g. of sodium methoxide in 150 ml. of methanol is added 4.5 g. of p-benzoquinone monoxime semicarbazone and 50 ml. of water. The resulting solution is filtered, and the filtrate placed in a Paar bottle and pressured with 60 p.s.i. of nitric oxide, following the procedure described in Example XXIII. When the pressure becomes constant, the reaction mixture is poured into an excess of acetone, and the solids content of the resulting mixture is separated by filtration, washed with acetone, and dried. The dried precipitate weighs 3.2 g. A sample of the precipitate washed with methanol and dried under vacuum has an elemental analysis corresponding to the calculated analysis for the sodium salt of 1-(p-[nitrosohydroxylamino]phenyl)-1-nitrososemicarbazide: Calculated for $C_7H_7N_6NaO_4$: C, 32.06; H, 2.69; N, 32.05; that found is: C, 32.23; H, 2.55; N, 31.88.

The corresponding thiosemicarbazide is prepared by dissolving 4.9 g. of p-benzoquinone monoxime thiosemicarbazone in a solution of 1.35 g. of sodium methoxide in 75 cc. of methanol. The filtered solution is cooled to −80° C., in a Paar reaction bottle which, after evacuation of oxygen, is pressured with 60 p.s.i. of nitric oxide. The said product is separated from the reaction mixture by filtration, washed with methanol and vacuum dried. There are obtained 3.1 g. of the sodium salt of 1-(p-[nitrosohydroxylamino]phenyl) - 1 - nitrosothiosemicarbazide, as a dark brown powder which evolves nitric oxides on acidification.

Example XXVII

Ten g. (0.95 mole) of p-nitrosodiphenylamine is dissolved in a solution of 8.0 g. (0.7 mole) of NaOH in 100 ml. of water. The resulting solution is filtered and the filtrate placed in a Paar bottle, cooled, and placed in the shaker in a Paar apparatus. After thorough flushing with nitrogen, the apparatus is pressured with 60 p.s.i. of nitric oxide. Absorption of 12 p.s.i. (0.10 mole) of nitric oxide while the reaction mixture is shaken in the apparatus is rapid. The unreacted nitric oxide is flushed out with nitrogen, and the precipitated product in the reaction mixture is isolated by filtration. After the yellowish precipitate has been washed and dried, there are obtained 8.1 g. (58% yield) of the sodium salt of p-(N-nitrosohydroxylamino)-N'-nitrosodiphenylamine, having an elemental analysis corresponding to that calculated for $C_{12}H_9N_4NaO_3$: Calculated analysis is C, 51.43; H, 3.24; N, 20.0; Na, 8.21; that found is: C, 51.53; H, 3.58; N, 19.93; Na, 8.09.

A sample of this precipitate is added to concentrated HCl, and the resulting solution poured into water which is made basic with NaOH. Carbon dioxide is passed into this solution, precipitating a black solid which is isolated and again dissolved in aqueous NaOH. This solution is filtered and the filtrate again treated with $CO_2$, bringing down a brown precipitate consisting of N-phenyl-p-benzoquinone monoxime imine: the precipitate, after washing and drying, melts at 141.5–143.5° C., and its mixed melting point with an authentic sample of the said imine is 142.5–144° C.

The sodium salt of p-(N-nitrosohydroxylamino)-N'-nitrosodiphenylamine is soluble in methanol and slightly soluble in water.

The silver salt of p-(N-nitrosohydroxylamino)-N'-nitrosodiphenylamine is formed by adding 0.9 g. of silver nitrate in 25 ml. of water to a solution of 1.4 g. of the sodium salt in 100 ml. of 50% aqueous methanol. It is a red precipitate.

To form the methyl ether, $$C_6H_5N(NO)C_6H_4N(NO)OCH_3$$

the stated silver salt, 2.0 g., suspended in 50 cc. of methanol, is mixed with methyl iodide, 2 cc. The mixture is stirred for ½ hour, and the resulting precipitate is filtered off and washed with methanol. Water is added to the filtrate until the cloud point is reached, and the aqueous liquid is cooled to precipitate 0.55 g. of the ether as crystals. The product, recrystallized from methanol, melts at 142–144° C. (decomp.). Calculated C, 57.35; H, 4.44; N, 20.58. Found: C, 57.40; H, 4.22; N, 20.48.

*Examples XXVIII–XXXIII*

Proceeding as described in the preceding example, the following nitrosoarylamines are converted to sodium salts of N,N'-dinitrosohydroxylamino aryl amines.

All the starting materials conform to the formula $(ON-Aryl-NH)_nR$, where aryl, R and n are as indicated in the following table.

Thus, with 100 parts of Buna N, a butadiene-acrylonitrile rubber, vulcanized 40 minutes at 307° F., the properties of the cured rubber were: tensile, 1000 p.s.i.; elongation, 700%. With 100 parts of SBR (styrene-butadiene rubber), the properties were: tensile, 1200 p.s.i.; elongation, 420%.

Substituting 4 parts of the corresponding di-silver salt for the triethylamine salt in the formulations stated in the preceding paragraph gave properties for the cured Buna S rubber as follows: tensile, 1760 p.s.i.; elongation, 330%. For the cured SBR, these values were: tensile, 1300 p.s.i.; elongation, 320%.

The bis(triethylamine) and bis(di-n-propylamine) salts are prepared by procedures like those described above for preparation of the corresponding dipiperidino and dipiperazino salts.

Basic mixes are made by combining 100 parts of polychloroprene (Neoprene WRT) with 58 parts SRF carbon black, 5 parts magnesium oxide, and 4 parts zinc oxide with amine salts, and these are cured by holding the stock at 307° F. for 30 minutes. The di-piperazine salt of p-phenylene-N,N'-dinitrosohydroxylamine at a level of 0.5 part in the above-stated mix composition gives a tensile of 1400 p.s.i. and 500% elongation; at 1.0 part, these values are 1525 p.s.i. and 470%. The corresponding di-piperidine salt at 0.5 part produces a tensile strength of 1900 p.s.i. and 470% elongation; at 1.0 part, 2475 p.s.i. and 460%.

| Example No. | Starting Materials | | | Yield, Percent | Analysis, Percent (Calc. found) | | | |
|---|---|---|---|---|---|---|---|---|
| | Aryl | R | n | | C | H | N | Na |
| XXVIII | Naphthyl | Phenyl | 1 | 24 | 60.90 | 3.34 | | 6.3 |
| XXIX | Phenyl | —CH₂CH₂COONa | 1 | 42 | 61.23 | 3.58 | | 6.78 |
| | | | | | 36.25 | 2.69 | 18.79 | 15.42 |
| | | | | | 36.08 | 3.09 | 19.08 | 15.31 |
| XXX | do | 2-nitrophenyl | 1 | 40 | 44.30 | 2.49 | | 7.0 |
| | | | | | 44.87 | 2.84 | | 6.78 |
| XXXI | m-Tolyl | Ethyl | 1 | 23 | | | | 9.34 |
| | | | | | | | | 9.43 |
| XXXII | Phenyl | Methyl | 1 | | 38.54 | 3.24 | 25.68 | |
| | | | | | 38.86 | 3.44 | 25.59 | |
| XXXIII | do | —CH₂CH₂— | 2 | 48 | 38.68 | 2.8 | 25.81 | 10.48 |
| | | | | | 38.62 | 3.3 | 25.71 | 9.96 |

*Examples XXXIV and XXXV*

The procedure of the preceding examples is repeated, but substituting a solution of sodium methoxide in methanol for the sodium hydroxide in water. The amines treated are: XXXIV N-ethyl 4-nitroso-1-naphthylamine, XXXV N-2-chloropropyl 4-nitrosoaniline. An 18% yield of N - ethyl - N - nitroso - 4 - (N - nitrosohydroxylamino)-1-naphthylamine sodium salt (calculated, Na: 8.14; found, Na, 8.48) is obtained. The yield of the sodium salt of N-(2-chloropropyl)-N-nitroso-p-(N-nitrosohydroxylamino) aniline is 31%: Cl calculated 12.85, found, 12.43; Na calculated 8.25, found 8.08.

*Example XXXVI*

This example illustrates use of salts as provided hereby to cure rubbers under basic and neutral conditions.

Basic mixes made by combining 100 parts of smoked sheet natural rubber, a neutral elastomer, with 40 parts of EPC carbon black, an acidic black, and 4 parts of zinc oxide, a basic filler, are mixed with 4 parts of amine salts consisting, respectively, of the bis(triethylamine) and bis (di-n-propylamine) salts of p-phenylene-N,N'-dinitrosodihydroxylamine, and these stocks are vulcanized by holding them at 307° F. for 30 minutes. The cured rubbers have the following properties: containing the triethylamine salt: tensile, 1760 p.s.i., elongation, 375%; containing the di-n-propylamine salt: tensile, 960 p.s.i., elongation, 350%.

Basic mixes made by combining 4 parts triethylamine salt with 4 parts zinc oxide, 40 parts EPC carbon black, and 100 parts of other neutral rubbers are similarly cured.

*Example XXXVII*

These examples illustrate conversion of arylmethylene quinone oximes to salts of (arylcarbyl)aryl-N-nitrosohydroxylamines.

In an illustrative procedure, to prepare the piperidine salt of the p-(α-cyanophenylcarbyl) phenyl-N-nitrosohydroxylamine, 4.2 g. of piperidine is mixed with 11.1 g. of phenylcyanomethylene 1,4-benzoquinone oxime in 40 ml. of methanol. The solution, held in a Paar reaction bottle, is cooled below room temperature. After removal of oxygen from the reaction vessel, it is charged with nitric oxide to 60 p.s.i., and the temperature let rise to room temperature. One mole of nitric oxide is absorbed, and the reaction mixture is formed to contain the product as a very pale yellowish precipitate. After washing with methanol, its analysis corresponds to the dimeric formula $C_{38}H_{42}N_8O_4$ as follows: C calc., 67.63, found 67.71%; H calc., 6.27, found, 6.52%; N calc., 16.61, found 16.79%; O calc., 9.48, found 9.54%.

Proceeding similarly, but substituting a molar equivalent of (p-chlorophenyl)cyanomethylene benzoquinone oxime, there is obtained the piperidine salt of the (α-cyano - ar - chlorophenylcarbyl)phenyl - N - nitrosohydroxylamine: Calc. for $C_{38}H_{40}N_8O_4Cl_2$: C, 61.37; H, 5.42; N, 15.07; O, 8.60. Found: C, 61.56; H, 5.11; N, 14.89; O, 8.61.

The (p-methoxyphenyl)cyanomethylene benzoquinone oxime similarly produces the piperidine salt of the (α-cyano - ar - methoxyphenylcarbyl)phenyl - N - nitrosohydroxylamine: Calc. for $C_{40}H_{46}N_8O_6$: C, 65.37; H, 6.31;

N, 15.25; O, 13.06. Found: C, 65.68; H, 6.43; N, 14.59; O, 12.71.

Using the stated procedure, but substituting an equivalent quantity of sodium hydroxide in water for the methanol and piperidine with each of these oximes, the corresponding sodium salts are prepared. Like the piperidine salts, they are light-colored (pale yellow to white) powders, which give the characteristic Liebermann test for the N-nitroso group. The salts prepared as described in this example, with absorption of 1 mole of NO, do not seem to be dimers which can dissociate into free radicals, from which it appears that the cyano-substituted carbon atom is not unsaturated. The evidence indicates that the compound contains a [p-(N-nitrososodiohydroxylamino)phenyl]phenyl cyanomethylidene structure, and while it suggests a monomeric structure, a dimeric structure (for example, with one cyano-substituted carbon atom linked by way of the aromatic ring to the second half of the dimer) is also permissible.

Example XXXVIII

The disodium salt of p-phenylene-N,N'-dinitrosodihydroxylamine is converted to the corresponding disilver salt by adding 34 g. of silver nitrate in 100 ml. of water to a filtered solution of 12.1 g. of the sodium salt in 700 ml. of water. The precipitated silver salt is filtered off and washed with water and methanol and dried.

The dimethyl ether is now prepared by adding 14.2 g. of methyl iodide to a suspension of 15.85 g. of the dried silver salt in 100 ml. of methanol, and stirring in a sealed flask. Twenty-four hours later, an additional 12 g. of methyl iodide is added, and the flask is resealed and stirring continued for 9 days. A yield of 150 mg. of the dimethyl ether of p-phenylene-N,N'-dinitrosodihydroxylamine is obtained after the crude product is separated from the filtrate by evaporation, washed with ether, and recrystallized four times from ethanol. The purified ether melts at 208–211° C. and analyzes correctly for the ether: Calc.: C, 42.48; H, 4.46; N, 24.77. Found: C, 42.49; H, 4.35; N, 24.83.

While the invention has been described with reference to various particular preferred embodiments thereof, it is to be appreciated that modifications and variations can be made within the scope of the preceding specification and the following claims.

What is claimed is:

1. The method of forming a nitroso-substituted salt which comprises reacting, under a substantially oxygen-free atmosphere, an oxime compound selected from the group consisting of aldoximes and quinone oximes with at least one equivalent, per NOH group of said oxime compound, of nitric oxide, in the presence of at least one equivalent, per NOH group of said oxime compound, of a base selected from the group consisting of alkali metal and ammonium bases and amines capable of forming salts with oximes.

2. The method of claim 1 wherein said oxime compound is a quinone oxime.

3. The method of claim 2 wherein said quinone oxime is a benzoquinone dioxime.

4. The method of claim 1 wherein the quinone oxime is a quinone oxime imine.

5. The method of claim 4 wherein the quinone oxime imine is formed by tautomerization of the corresponding nitrosoaryl secondary amine.

6. The method of claim 5 wherein the nitrosoaryl secondary amine is selected from the group consisting of p-nitroso diphenylamine and bis(p-nitrosophenyl) ethylene diamine.

7. The method of claim 1 wherein said oxime compound is an aldoxime.

8. The method of claim 7 wherein said aldoxime is a benzaldoxime.

9. A N,N'-dinitroso N,N'-dihydroxy arylene diamine salt of the formula

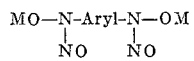

where M is a cation selected from the group consisting of alkali metals, alkaline earth metals, heavy metals, silver, iron, nickel, cobalt, ammonium and amino, and where aryl is selected from the group consisting of phenyl, naphthyl, anthracyl and phenanthracyl nuclei.

10. The compound of claim 9 wherein M is sodium and aryl is phenyl.

11. A 1-oximino-1-N-nitrosohydroxylamine salt of the formula

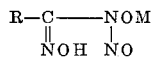

where M is a cation selected from the group consisting of alkali metals, alkaline earth metals, heavy metals, silver, iron, nickel, cobalt, ammonium and amino, and where R is selected from the group consisting of alkyl and chloroalkyl groups containing from 1 to 12 carbon atoms, phenyl, chlorophenyl, lower alkyl phenyl, phenyl lower alkyl, phenyl lower alkylene, naphthyl, chloronaphthyl, lower alkyl naphthyl, thiophenyl and pyridyl and

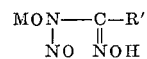

where R' is selected from the group consisting of lower alkylene and phenylene.

12. The compounds of claim 11 wherein R is selected from the group consisting of butyl, phenyl, cinnamyl, isopropylphenyl, chlorophenyl, thiophenyl, pyridyl and

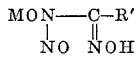

where R' is selected from the group consisting of phenylene and —CH$_2$—CH$_2$—CH$_2$—.

13. A 1,1-di(N-nitrosohydroxylamine) salt of the formula

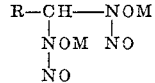

where M is a cation selected from the group consisting of alkali metals, alkaline earth metals, heavy metals, silver, iron, nickel, cobalt, ammonium and amino, and where R is selected from the group consisting of alkyl and chloroalkyl groups containing from 1 to 12 carbon atoms.

14. An N-nitroso-N-substituted N'-nitroso-N'-hydroxyl arylene diamine salt having the formula

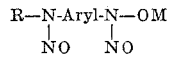

where M is a cation selected from the group consisting of alkali metals, alkaline earth metals, heavy metals, silver, iron, nickel, cobalt, ammonium and amino; where aryl is selected from the group consisting of phenyl, naphthyl, anthracyl phenanthracyl, and where R is selected from the group consisting of phenyl, nitrophenyl, naphthyl, alkyl, chloroalkyl and

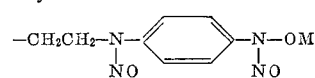

where M is as defined above.

15. The compounds of claim 14 wherein R is

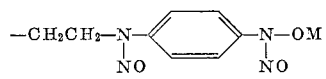

16. An N-nitroso-N-substituted amino N'-nitroso-N'-hydroxyl arylene diamine salt having the formula

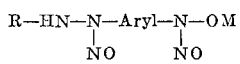

where M is a cation selected from the group consisting of alkali metals, alkaline earth metals, heavy metals, silver, iron, nickel, cobalt, ammonium and amino; where aryl is selected from the group consisting of phenyl, naphthyl, anthracyl and phenanthracyl, and where R is selected from the group consisting of hydrogen, carbamyl and thiocarbamyl.

17. A monoether of the formula

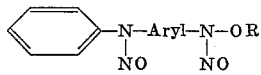

where aryl is selected from the group consisting of phenyl, naphthyl, anthracyl and phenanthracyl, and where R is selected from the group consisting of lower alkyl, benzyl, nitrobenzyl, chlorobenzyl and furanylmethyl.

18. A diether of the formula

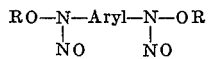

where aryl is selected from the group consisting of phenyl, naphthyl, anthracyl and phenanthracyl, and where R is selected from the group consisting of lower alkyl, benzyl, nitrobenzyl, chlorobenzyl and furanylmethyl.

19. The method of claim 1 wherein the oxime compound is a quinone oxime having the formula

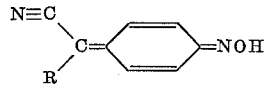

where R is selected from the group consisting of phenyl, chlorophenyl and methoxyphenyl.

20. The compounds prepared by reacting, under a substantially oxygen-free atmosphere, a quinone oxime having the formula

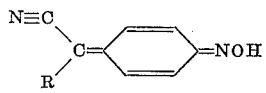

where R is selected from the group consisting of phenyl, chlorophenyl and methoxyphenyl, with at least one equivalent of nitric oxide in the presence of at least one equivalent of a base selected from the group consisting of alkali-metal and ammonium bases and amines capable of forming salts with oximes.

References Cited by the Examiner

UNITED STATES PATENTS

| | | | |
|---|---|---|---|
| 2,635,978 | 4/1953 | Massengale | 167—30 |
| 2,744,099 | 5/1956 | Mitchell et al. | 260—80.7 |
| 2,769,832 | 11/1956 | Reilly | 260—577 X |
| 2,844,630 | 7/1958 | Johnson | 260—566 |
| 2,890,248 | 6/1959 | Craig | 260—566 |
| 2,937,164 | 5/1960 | Brown et al. | 260—80.7 |
| 2,954,314 | 9/1960 | Metzger | 260—584 |
| 3,090,786 | 5/1963 | Levering et al. | 260—577 X |

WALTER A. MODANCE, *Primary Examiner.*

L. J. BERCOVITZ, NICHOLAS S. RIZZO, *Examiners.*

JAMES W. ADAMS, B. S. LEON, ALAN L. ROTMAN,
*Assistant Examiners.*